United States Patent
Fritzon et al.

(10) Patent No.: US 11,204,988 B2
(45) Date of Patent: Dec. 21, 2021

(54) ASSOCIATION VIA VOICE

(71) Applicant: Spotify AB, Stockholm (SE)

(72) Inventors: Thorbiörn Fritzon, Upplands Väsby (SE); Richard Mitic, Stockholm (SE)

(73) Assignee: Spotify AB, Stockholm (SE)

( * ) Notice: Subject to any disclaimer, the term of this patent is extended or adjusted under 35 U.S.C. 154(b) by 194 days.

(21) Appl. No.: 15/958,222

(22) Filed: Apr. 20, 2018

(65) Prior Publication Data

US 2019/0325120 A1 Oct. 24, 2019

(51) Int. Cl.
| | |
|---|---|
| G06F 21/00 | (2013.01) |
| G06F 21/32 | (2013.01) |
| G06F 16/683 | (2019.01) |
| G10L 17/06 | (2013.01) |
| G10L 17/22 | (2013.01) |

(52) U.S. Cl.
CPC ............ *G06F 21/32* (2013.01); *G06F 16/683* (2019.01); *G10L 17/06* (2013.01); *G10L 17/22* (2013.01)

(58) Field of Classification Search
CPC ...... G06F 21/32; G06F 16/638; G06F 16/683; G10L 17/22; G10L 17/06
See application file for complete search history.

(56) References Cited

U.S. PATENT DOCUMENTS

| | | | |
|---|---|---|---|
| 7,461,002 B2 | 12/2008 | Crockett et al. | |
| 9,172,699 B1 | 10/2015 | Vazquez et al. | |
| 9,449,647 B2 | 9/2016 | Sharpe et al. | |
| 9,865,268 B1 | 1/2018 | Narayanan | |
| 10,425,781 B1* | 9/2019 | Devaraj | H04W 8/186 |
| 10,482,885 B1* | 11/2019 | Moniz | G06F 3/167 |
| 2006/0282649 A1 | 12/2006 | Malamud et al. | |
| 2008/0256613 A1 | 10/2008 | Grover | |
| 2009/0259468 A1 | 10/2009 | Schroeter | |
| 2013/0308506 A1 | 11/2013 | Kim et al. | |
| 2015/0142438 A1 | 5/2015 | Dai et al. | |
| 2016/0105428 A1* | 4/2016 | Schrempp | H04L 65/4076 726/7 |
| 2016/0212552 A1* | 7/2016 | Schneider | H04L 67/06 |

(Continued)

FOREIGN PATENT DOCUMENTS

WO 2017/028249 A1 2/2017

OTHER PUBLICATIONS

S. Shum, "The Basics of Audio Fingerprinting" (Oct. 24, 2011). Available at: http://people.csail.mit.edu/sshum/talks/audio_fingerprinting_sls_24Oct2011.pdf.

(Continued)

*Primary Examiner* — Joseph P Hirl
*Assistant Examiner* — Chi D Nguy
(74) *Attorney, Agent, or Firm* — Merchant & Gould P.C.

(57) ABSTRACT

A server has a pool data store that stores ambient sound recordings for matching. A match engine finds matches between ambient sound recordings from devices in the pool data store. The matching ambient sound recordings and their respective devices are then analyzed to determine which device is a source device that provides credentials and which device is a target device that receives credentials. The server then obtains or generates credentials associated with the source device and provides the credentials to the target device. The target device accesses content or services of an account using the credentials.

19 Claims, 8 Drawing Sheets

(56) References Cited

U.S. PATENT DOCUMENTS

| | | | |
|---|---|---|---|
| 2016/0363914 A1* | 12/2016 | Kim | A61B 5/165 |
| 2017/0019394 A1 | 1/2017 | Yastrebenetsky et al. | |
| 2017/0208428 A1* | 7/2017 | Lim | H04W 12/06 |
| 2018/0137859 A1* | 5/2018 | Park | G06F 16/61 |
| 2019/0066670 A1* | 2/2019 | White | G10L 15/28 |
| 2019/0206396 A1* | 7/2019 | Chen | G10L 15/30 |

OTHER PUBLICATIONS

Shoup et al., "An Overview and Analysis of Voice Authentication Methods" (2016). Available at: https://courses.csail.mit.edu/6.857/2016/files/31.pdf.

Extended European Search Report from European Appl'n No. 19169797.8, dated Sep. 25, 2019.

Jen Kamer: "How to set up Google Home with multiple users", Android Central, (Aug. 16, 2017), XP055620703, Retrieved from the Internet: URL:https://web.archive.org/web/2018012504 1533/https://www.androidcentral.com/how-set-google-home-multiple-users.

\* cited by examiner

ASSOCIATION VIA VOICE

TECHNICAL FIELD

The present disclosure relates to technical solutions for associating a target device with credentials or an account of a source device.

BACKGROUND

The process of associating a software or hardware product with an account of a user often includes the user providing a username and password using a tactile or virtual keyboard. However, there are technical drawbacks and challenges with this process: not all devices have a keyboard (e.g., voice-first devices), not all keyboards are available for use (e.g., for attention or accessibility reasons), and username-password combinations are not always ideal for authentication, among others. Login difficulties are compounded by frequent switching of accounts, such as among family members sharing a device or when providing guest access.

While advancements have been made in transferring login credentials from one device to another, technical challenges still remain. Some techniques include pairing an already logged-in device with a non-logged-in device and transferring the credentials from the logged-in device to the non-logged-in device via an auxiliary channel, such as using HTTP on a local network (e.g., using zero configuration networking). Other techniques include device pairing over BLUETOOTH and transferring a login token over the connection. Typically, these techniques require an extra communication channel and, depending on the communication technique, consume significant energy resources for both devices. Such techniques further raise concerns when used for guest mode access. For example, where a connection is made via a same WI-FI network, sharing access credentials for the network can be undesirable for security or privacy purposes.

Still other techniques use audio to transmit data, such as using broadband phase difference encoding. Such techniques can synthesize audio directly or by masking with existing audio. For example, Multimedia Information Hiding Technologies for Controlling Data (Kazuhiro Kondo, 2013) describes the use of acoustic orthogonal frequency-division multiplexing at page 94. Some techniques include transferring small amount of data encoded in an audio signal, decode the data, and then use the decoded data to look up large pieces of data available at a backend system. Fast Fourier transform or similar transforms are usable to extract the sequence of tones on the client side and transmit that to the backend to retrieve the larger information. Using audio to transmit data often results in robotic-sounding audio lacking aural aesthetics.

US 2017/0019394 describes playing media items from a guest's media account on a host's media player. A guest device discovers a host media player over a wireless local area network. A token can be provided from the host media player to the guest device. The token is encoded into an audio file, which is played by the host media player. The audio is captured by the guest device and decoded into the token, which is transmitted to a server for verification.

SUMMARY

The present disclosure provides methods, apparatuses, and computer readable products for using audio to associate a target device with credentials of a source device.

In an example, there is a method, including: receiving, from a source device associated with a source device account a source device ambient sound recording; receiving, from a target device, a target device ambient sound recording; matching the source device ambient sound recording and the target device ambient sound recording together based on one or more similarities between the source device ambient sound recording and the target device ambient sound recording; and associating the target device with the source device account responsive to the matching.

In an example, wherein associating the target device with the source device account includes providing credentials to the target device. In an example, the method further includes providing the source device ambient sound recording for matching responsive to determining that the source device ambient sound recording includes a log-in utterance; and providing the target device ambient sound recording for matching responsive to determining that the target device ambient sound recording includes a log-in utterance. In an example, the method further includes obtaining source device signals from the source device; and wherein matching the source device ambient sound recording and the target device ambient sound recording together is further based on the target device signals. In an example, the method further includes obtaining target device signals from the target device, wherein matching the source device ambient sound recording and the target device ambient sound recording together is further based on the target device signals. In an example, the method further includes after the matching and prior to the associating, determining to associate the target device with the source device account based on the source device signals and the target device signals. In an example, determining to associate the target device with the source device account is further based on a hierarchy of device types, the device type of the source device, and the device type of the target device. In an example, the method further includes prior to associating the target device with the source device account, operating the target device in a primary mode associated with a target device account. In an example, associating the target device with the source device account includes operating the target device in a guest mode associated with the source device account. In an example, the target device automatically reverts to the primary mode associated with the target device account after an occurrence of an event. In an example, the event is a device power event. In an example, the method further includes storing the source device ambient sound recording in a pool data store; storing the target device ambient sound recording in the pool data store; and determining matches between recordings in the pool data store. In an example, determining matches between recordings in the pool data store includes the matching of the source device ambient sound recording and the target device ambient sound recording together. In an example, the method further includes removing the source device ambient sound recording and the target device ambient sound recording from the pool data store after the matching of the source device ambient sound recording and the target device ambient sound recording together.

In an example, there is a system that includes one or more processing devices; and a memory device coupled to the one or more processing devices and comprising instructions thereon that, when executed by the one or more processing devices, cause the one or more processing devices to perform any of the previously described methods.

BRIEF DESCRIPTION OF THE DRAWINGS

The features and advantages of the present disclosure will become more apparent from the detailed description set forth below when taken in conjunction with the following drawings.

DETAILED DESCRIPTION

Figure 1:
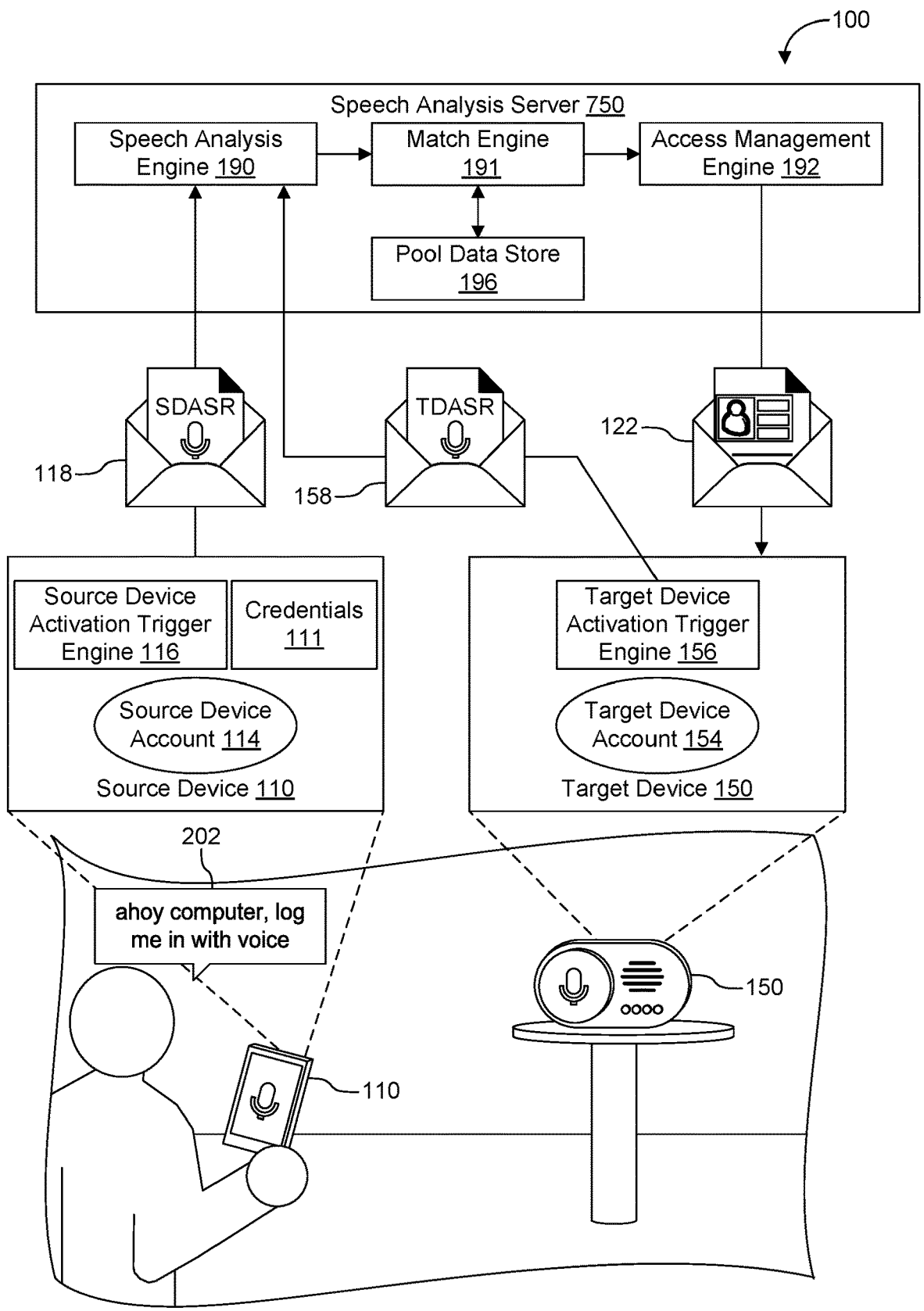
FIG. 1 illustrates an example system including a source device, a target device, and a speech analysis server.

The example embodiments presented herein are directed to systems, methods, and non-transitory computer-readable medium products for associating a target device with credentials of a source device based on matching ambient sound recordings from both devices. This is for convenience only, and is not intended to limit the application of the present invention. After reading the following description, it will be apparent to one skilled in the relevant art how to implement the following disclosure in alternative embodiments.

As used herein, "credentials" are data usable for authentication or to gain access to particular content or services. In many examples herein, credentials are associated with a particular account (e.g., credentials usable to log into or otherwise gain access to services associated with an account). Credentials are usable to perform an authentication or association process with an application or server, such as using OAUTH 2.0, OPENID CONNECT (maintained by the OPENID FOUNDATION), SAML (maintained by OASIS of Burlington, Mass.), or other standards, protocols, or techniques. Other uses for and examples of credentials will be apparent to one of skill in the art. In some examples, the credentials are representative of a username and password for an account of a service. In some instances, the credentials are use-limited or time-limited, such as one-session-use credentials or credentials valid for limited amount of time.

As used herein, "target device" refers to a computing device with which credentials (e.g., credentials of an account) are to be associated and "source device" refers to a computing device with which the credentials are currently associated. This distinction is mutable. A device can be a target device in a first process and the same device can be a source device in a second process.

In an example situation, the source device is a smartphone having an audio streaming application. The audio streaming application is associated with a source device account. The audio streaming application uses the source device account to access audio streaming services associated with the source device account (e.g., accessing an audio library associated with the source device account). The user of the source device wants to access the audio streaming service using the source device account on a nearby target device. In the example, the target device is a smart speaker system. Both the source device and the target device receive an utterance, "ahoy computer, log me in with voice", spoken by the user. Both devices independently wake up from a sleep mode in response to detecting the activation trigger "ahoy computer". Both devices independently begin recording ambient sound. By recording ambient sound, both devices independently create an ambient sound recording, which includes the "log me in with voice" portion of the utterance. Both devices independently send the ambient sound recording to the remote server. The remote server receives the ambient sound recordings. The remote server uses a speech analysis engine to determine an action to perform based on the ambient sound recordings. The speech analysis engine determines that ambient sound recordings include a phrase such as "log me in with voice" and begin a log-in-with-voice process, which causes the ambient sound recordings to be sent to a match engine. The match engine stores the ambient sound recordings in a pool data store. The match engine determines matching recordings within the pool data store. The match engine matches the source device ambient sound recording (e.g., the recording from the smartphone) with the target device ambient sound recording (e.g., the recording from the smart speaker system) based on audio characteristics and additional signals associated with the respective ambient sound recordings. At this point, the match engine identified the devices that match but not which of the devices is the source device and which device is the target device. The match engine then determines which of the matched devices is the source device and which is the target device. Based on this determination, the match engine identifies from which device to obtain credentials (e.g., the source device) and to which device the credentials will be provided (e.g., the target device). The match engine determines that the source device (e.g., the smartphone) is the source of the account credentials and that the target device (e.g., the smart speaker system) is the device that is the target recipient of the credentials. This determination is based on a hierarchy of device types. The match engine determines the device type of the source device is a smartphone and the device type of the target device is a smart speaker system. The match engine determines source device is the source device and the target device is the target device because the smart speaker systems are higher than a smartphone in the hierarchy of device types. With the source device and target device identified, the server provides credentials of the source device account to the target device. The target device then uses the source device account to access the streaming service and obtain content based on the source device account.

Among other advantages, embodiments disclosed herein allow for the association of an account with a nearby device with the user's voice. In contrast to using audio steganography to transmit login tokens, this association-with-voice process uses the user's own voice, which provides several advantages. For example, the audio content used in the process need not necessarily be specially formatted (e.g., formatted to encode data) for the purpose of logging in to the account. This increases security by obviating the need to audibly broadcast or receive login credentials. It also improves the user interface provided by the device because the device can initiate the process by merely receiving an utterance from the user, which reduces an amount of user input that the device needs to receive (and thus that the user needs to provide). Further, the association-with-voice process provides an intuitive pattern for a voice-based user interface: the device does what the user tells it to do. This not only improves the ease of use of the system but also reduces computing resources that would be used in the process. For instance, the device need not necessarily be specially programmed or include specialized hardware for encoding, decoding, or receiving audio steganography data. In this manner, computing resources are conserved. Other advantages will be apparent to one skilled in the art on consideration of the examples described herein.

System for Using Ambient Sound Recordings to Associate a Target Device with an Account of a Source Device FIG. 1 illustrates an example system 100 including a source device 110, a target device 150, and a speech analysis server 750. The source device 110 and the target device 150 provide an utterance-based user interface. The source device 110 is a computing device and uses the credentials 111 to access services or content associated with a source device account 114. The target device 150 is a computing device with which the user wants to associate the source device account 114. In many examples, the target device 150 already includes or is associated with a target device account 154 via its own set of credentials. The user of the source device 110 is, for example, a guest in the home of the person that owns the target device 150. In such instances, the target device 150 is likely already associated an account (the target device account 154) of its owner. Nonetheless, the guest may want to control playback of the target device 150 by associating the target device 150 with his or her account (e.g., the source device account 114). In the illustrated example, both the source device 110 and the target device 150 receive a same utterance 202 which causes the target device 150 to associate with the source device account 114 of the source device 110.

In an example, the speech analysis server 750 is associated with a streaming audio service and the credentials 111 are associated with the source device account 114. In an example, the source device 110 uses the credentials 111 to access one or more streaming audio services associated with the source device account 114. The services can include, for example, audio playback services, library management services (e.g., a song library, a playlist library, or an album library, among others), media content purchasing services, taste profile services (e.g. services relating to the likes and dislikes of the user), content sharing services, and account management services, among others.

The utterance 202 is voice input to the utterance-based user interfaces provided by the source device 110 and the target device 150. In the example system 100, the utterance 202 includes the example phrase "ahoy computer, log me in with voice". Both devices 110, 150 separately listen to ambient sounds using a microphone or another input source. In turn, the devices 110, 150 process the ambient sounds, to detect and further process utterances spoken in the vicinity of the devices 110, 150. In the illustrated example, both the source device 110 and the target device 150 receive and process the utterance 202.

As illustrated the source device 110 includes a source device activation trigger engine 116, and the target device 150 includes a target device activation trigger engine 156. The source device activation trigger engine 116 detects an activation trigger spoken in the vicinity of the source device 110. Responsive to detecting the activation trigger, the source device 110 creates a source device ambient sound recording 118, which is sent from the source device 110 to the speech analysis engine 190 for processing. Separately, the target device activation trigger engine 156 detects an activation trigger spoken in the vicinity of the target device 150. Responsive to detecting the activation trigger, the target device 150 creates and sends a target device ambient sound recording 158 to the speech analysis engine 190 for processing. In some examples, creating the source device ambient sound recording 118 and the target device ambient sound recording 158 includes creating an audio clip of the ambient sound or establishing a streaming connection with the speech analysis server 750. For instance, the target device 150 records the ambient sounds to a buffer at the target device 150 and the contents of the buffer are streamed to the speech analysis server 750, thereby providing the target device ambient sound recording 158 to the speech analysis server 750.

In the illustrated example, both of the activation trigger engines 116, 156 are trained to detect the activation trigger "ahoy computer", though other activation triggers can be used. Because the utterance 202 is detected by both activation trigger engines 116, 156, both devices 110, 150 separately provide respective ambient sound recordings 118, 158 to the speech analysis engine 190 for further processing.

The speech analysis engine 190 processes recordings to understand their contents and select an action to perform based thereon. In an example, the processing involves speech-to-text processing on recordings and performing natural language processing on the resulting text. The speech analysis engine 190 outputs an intent based on the analysis of the natural language processing. The intent is usable by the speech analysis engine 190 or another component of the speech analysis server 750 to select and perform an action associated with the recording.

In the illustrated example, the speech analysis engine 190 performs analysis on the source device ambient sound recording 118 and the target device ambient sound recording 158. The speech analysis engine 190 determines from the utterance 202 contained in the ambient sound recordings 118, 158 to cause a log-in-with-voice command to be executed. In executing the command, the speech analysis engine 190 provides the ambient sound recordings 118, 158 to the match engine 191.

The match engine 191 determines matches between two or more recordings. The match engine 191 determines that there is a match if a similarity of the recordings passes a predetermined threshold. In many examples, the similarity is based on whether the recordings are of a same place at a same time. Determining whether the recordings are of a same place at a same time can be based on a variety of factors, including whether the recordings capture a same event (e.g., a user speaking an utterance, same music playing, same car engine noise, etc.). The match engine 191 uses a variety of data to make its determinations, such as the sonic qualities of the recordings, as well as other signals about the recordings (e.g., locations where the recordings are taken, the time at which the recordings were received, etc.).

The match engine 191 uses a pool data store 196 to store recordings and associated data for matching. The match engine 191 curates the pool data store to remove old entries. When a new recording is provided to the match engine 191, the match engine 191 compares the new recording to those recordings in the pool data store 196 to determine if there is a match. If there is not a match, then the new recording is added to the pool data store 196. If there is a match, then the one or more matching recordings in the pool are removed, and the match engine 191 provides an output indicating which recordings match. For instance removing the source device ambient sound recording 118 and the target device ambient sound recording 158 from the pool data store 196 after the matching of the source device ambient sound recording 118 and the target device ambient sound recording 158 together. In an example, the output includes identifiers (e.g., device identifiers) of the devices that matched. In an example, the match engine 191 calls an application programming interface (API) of the access management engine 192 with the matching devices as parameters.

The data in the pool data store 196 can be handled according to a defined user privacy policy. In some embodiments, data elsewhere in the system 100 can be handled according to a defined user privacy policy. Generally, data can be used to the extent allowed by the user. In examples, the system 100 provides customizable privacy parameters. For instance, the system 100 maintains one or more privacy parameters directing components of the system 100 as to what data may be stored and how the data is used. One or more parameters are user-customizable, such as through a voice command (e.g., "ahoy computer, don't store what I say" or "ahoy computer, I like my privacy!"). In an example, the system 100 disallows authentication based on ambient sound recordings from devices unless allowed by the privacy parameters. In some examples, the storage of data is based on a location of the source device 110 or the target device 150. For instance, the system 100 receives the location of the devices 110, 150 and determines privacy settings based thereon. In addition, the data contained in the pool data store 196 is stored in accordance with applicable regulations. Data can also be stored and used in association with a defined security policy. For example, data can be encrypted at rest and in motion. For instance, ambient sound recordings are encrypted during transmission and encrypted while stored. In an example, the ambient sound recordings are authenticated in a manner other than using user credentials. In an example, transmission channels (e.g., for the audio input data) are authenticated in a manner other than using user credentials, such as using data regarding the device 100 itself.

In the illustrated example, the match engine 191 receives the source device ambient sound recording 118. The match engine 191 also receives the target device ambient sound recording 158. In an example, the match engine 191 receives the source device ambient sound recording 118 first.

The match engine 191 compares the source device ambient sound recording 118 against any recordings in the pool data store 196. The match engine 191 does not find a match. In response to not identifying a match between the source device ambient sound recording 118 and any recordings in the pool data store 196, the match engine 191 adds the source device ambient sound recording 118 to the pool data store 196. Next, the match engine 191 receives the target device ambient sound recording 158. The match engine 191 compares the target device ambient sound recording 158 to the one or more recordings in the pool data store 196. The match engine 191 identifies a match between the source device ambient sound recording 118 and the target device ambient sound recording 158. Responsive to finding the match, the match engine 191 provides an output to the access management engine 192 identifying a match between the source device ambient sound recording 118 and the target device ambient sound recording 158. The output indicates that the source device 110 and the target device 150 match as part of a log-in-with-voice function.

The access management engine 192 controls the credentials and access using the accounts. The access management engine 192 uses the matched devices output from the match engine 191 and provides credentials 122 to one of the devices.

Although FIG. 1 labels a particular device as a "source device" and a particular device as a "target device", in many examples the access management engine 192 does not yet have an identification of which of the devices is the source device and which is the target device. So the access management engine 192 or the match engine 191 determines which of the devices in the output is the source device 110 having the source device account 114 to be associated and which device is the target device 150 to receive the source device account 114. Example techniques for making the determination involve the use of hierarchies, relative volume, activity logs, and asking the user (which are each described further in relation to operation 450 in FIG. 4), among others.

In the illustrated example, the access management engine 192 determines that the source device is the source device because its device type is a smartphone, which is lower in the hierarchy than the target device 150, which is a smart speaker system. Based on the identification of the source device 110 as the source device and the target device 150 as the target device, the access management engine 192 provides credentials 122 to the target device 150. In some examples, the access management engine 192 determines an account associated with the device identifier associated with the source device 110. The access management engine 192 then obtains or generates the credentials 122 based thereon.

In some examples, the credentials 122 are identical to the credentials 111. In other examples, the credentials 122 are similar to the credentials 111 but have one or more different characteristics. Both credentials 111, 122 are associated with a same account, but the credentials 122 are flagged to distinguish the credentials 122 from the credentials 111, for instance. Flagging the credentials 122 provides benefits to revoking credentials 122 at a later time (e.g., manually or automatically when the user leaves the vicinity of the target device 150) by allowing the credentials to identified. Further, the user may not want the target device 150 (or other users thereof) to have full access to his or her account for privacy, security, or account management purposes.

The target device 150 uses the credentials 122 to access services or content provided by the speech analysis server 750. In an example, the source device 110 was playing a media content item and playback of the media content item is transferred from the source device 110 to the target device 150 automatically in response to the target device 150 accessing the speech analysis server 750 using the credentials 122. The transfer of playback provides an improved user experience by serving as a confirmation that the association completed successfully.

The source device 110 and target device 150 are illustrated as being a smartphone and a media streaming appliance, respectively, but the devices 110, 150 can take a variety of forms, including but not limited to laptop computers, desktop computers, media streaming appliances, smart speakers, Internet-of-things devices, and vehicle head units, among others.

Figure 2:
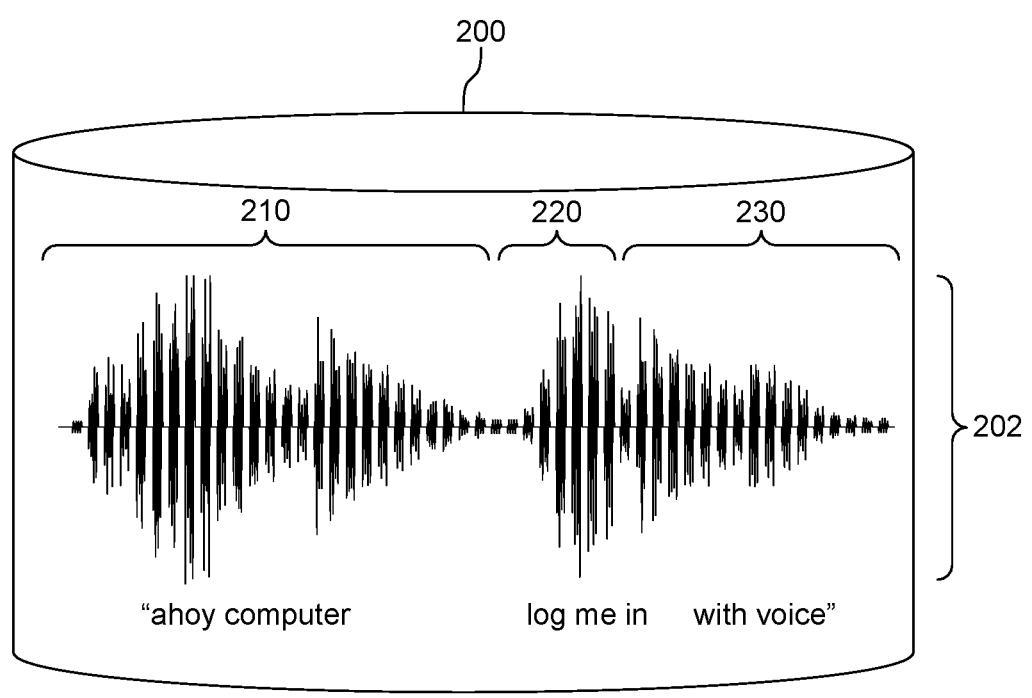
FIG. 2 illustrates an example utterance stored in a data store.
Figure 3:
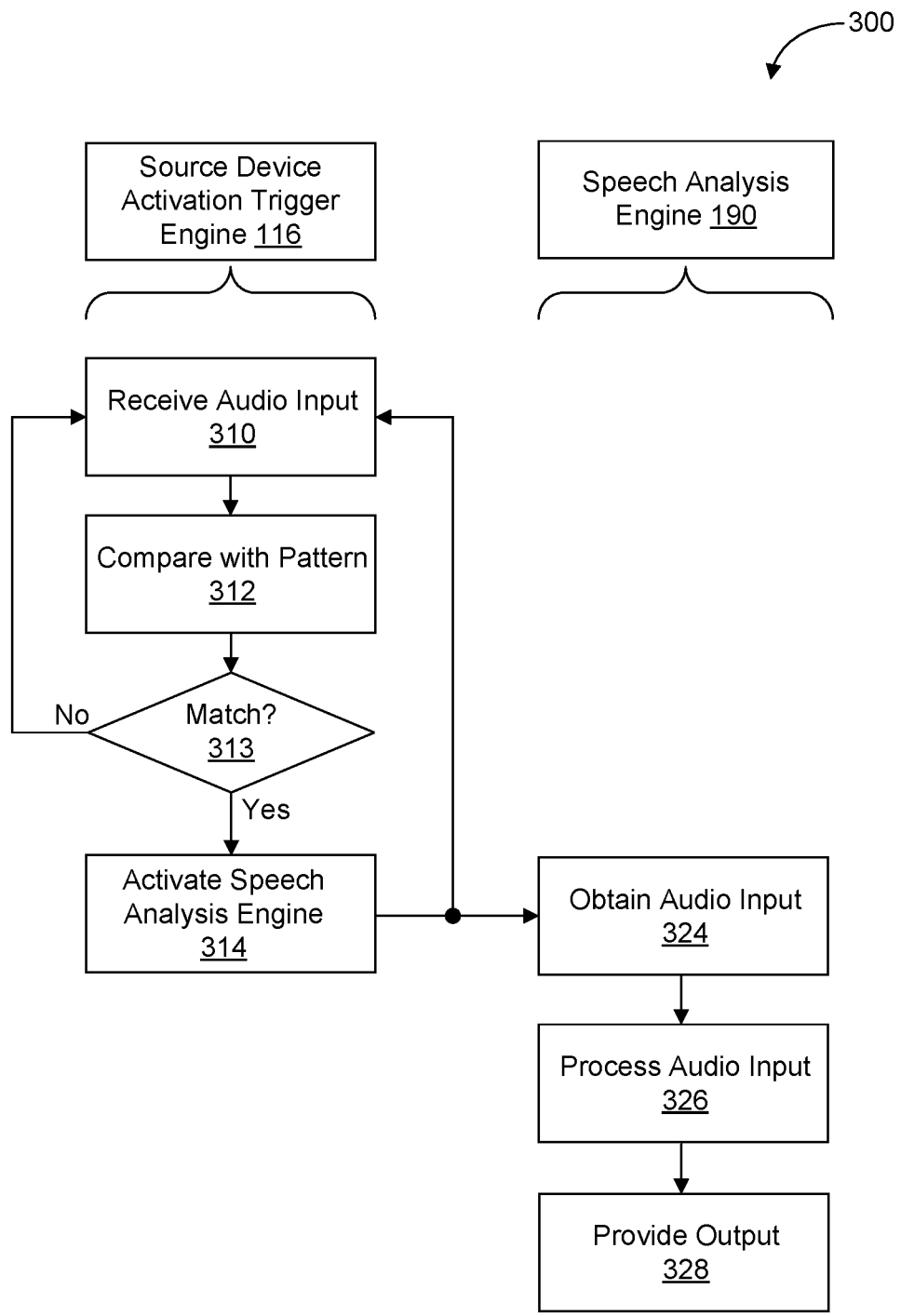
FIG. 3 illustrates an example flow diagram showing a process for providing a voice-based user interface using a source device activation trigger engine and a speech analysis engine.

In the illustrated example, the source device ambient sound recording 118 and the target device ambient sound recording 158 are based on the utterance 202 and provided to the speech analysis server 750 as part of a voice-based user interface, which is described in more detail in FIGS. 2 and 3.

Voice-Based User Interface

Software or hardware products that provide a voice-based user interface are configured to take action in response to utterances. FIGS. 2 and 3 describe an example voice-based user interface. For concision, the voice-based user interface is described in relation to the source device 110 and the source device activation trigger engine 116. The target device 150 and the target device activation trigger engine 156 has at least similar functionality.

FIG. 2 illustrates the example utterance 202 stored in a data store 200 (e.g., temporary memory). The utterance 202 includes an activation trigger portion 210, a command portion 220, and a parameter portion 230. In the illustrated example, the activation trigger portion 210 corresponds the phrase "ahoy computer", the command portion 220 corresponds to the phrase "log me in", and the parameter portion 230 corresponds to the phrase "with voice".

The source device 110 receives the utterance 202. Responsive to the source device activation trigger engine 116 detecting the activation trigger portion 210, the source device activation trigger engine 116 provides at least a portion of the utterance 202 to the speech analysis engine 190. The speech analysis engine process some or all of the utterance 202 and identifies one or more of the various portions 210, 220, 230.

Identifying the portions of the utterance 202 can be performed using a variety of techniques. In one example, segmenting the utterance 202 into constituent portions is based on the text content of the utterance (e.g., splitting on words or natural-language processing of the text content of the utterance). In another example, segmenting is based on how the utterance 202 was uttered (e.g., by splitting the utterance based on pauses in the utterance), among other techniques.

Where the speech analysis engine 190 determines that the utterance 202 includes the command portion 220, the speech analysis engine 190 determines a command associated with the command portion 220 (e.g., using natural language processing, look-up tables, or other techniques). Where the utterance 202 includes a parameter portion 230, the speech analysis engine 190 determines the parameters described by the parameter portion 230. The determined command is then executed using the determined parameters. Based on the output of the executed command, the device generates a response or confirmation for the user or takes another action.

Voice-based user interfaces use one or more activation triggers to activate one or more capabilities of an associated device. In many instances, an activation trigger is a predetermined word or phrase spoken by the user to activate a voice-based user interface. In some instances, the activation trigger is formed or detected as particular sound data above or below the threshold of human hearing. In other instances, the activation trigger is an electronic signal received by a device in response to an event, such as actuation of a button or other user input mechanism. In still other instances, the event includes a signal received from another device.

The activation trigger portion 210 serves several purposes, including overcoming challenges in voice-based user interfaces. Voice-based user interfaces generally operate by obtaining audio input from an ambient environment and appropriately responding to detected speech. As such, voice-based user interfaces receive all utterance in the ambient environment, including utterances not directed to the user interface. The detection of utterances not directed to the interface can present drawbacks. The use of an activation trigger provides several technical advantages, including conserving resources and protecting user privacy.

FIG. 3 illustrates an example flow diagram showing a process 300 for providing a voice-based user interface using the source device activation trigger engine 116 and the speech analysis engine 190. The process 300 begins at operation 310, which involves the source device activation trigger engine 116 receiving audio input. For instance, the source device activation trigger engine 116 receives audio input from a microphone of the source device 110 or a connection to an external audio source (e.g., a BLUETOOTH connection to a device that has a microphone). In some instances, the audio input is streaming audio input. In some instances, the audio input includes discrete slices of audio samples or chunked input. As will be understood, various portions of process 300 can occur simultaneously, and various buffers or caches can be used to facilitate the comparison of data over time.

In operation 312, the source device activation trigger engine 116 compares the audio input with one or more patterns to determine if the audio input includes an activation trigger. The obtained audio input can include utterances that are directed to the source device 110, utterances directed to another target (e.g., another person in the room), ambient room sound, or other sounds. A variety of different techniques can be used to determine if the audio input includes an activation trigger.

In one example, features are extracted from the audio input and provided to a machine learning framework configured to determine the likelihood that the extracted features correspond to an activation trigger. Various techniques can be used for feature extraction. In some examples, mel-frequency cepstrum representation of audio data is used to generate cepstral coefficients features for processing. In other examples, mel-frequency cepstral coefficients, log filter banks, cepstral analysis, or other techniques are used. In other examples, feature extraction is performed using invertible feature extraction (e.g., using Fourier transforms). For instance, instead of relying on features or parameters only from a time domain of a signal, the signal is transformed into a frequency domain using Fourier transformation. Parameters are then extracted from the frequency domain.

Once extracted, the extracted features are analyzed to determine a similarity with a pattern associated with an activation trigger. This analysis can be performed through a variety of techniques including, but not limited to, hidden Markov models, neural networks, and other techniques. In many instances, the source device activation trigger engine 116 includes a pre-trained or pre-generated pattern against which to compare the features.

At operation 313, if the received audio input matches the pattern, then the flow of the process moves to operation 314. If the received audio input does not match the pattern, the flow of the process 300 moves back to operation 310. In an example, the audio input matches the pattern if a difference between the features of the audio input and the pattern satisfies a threshold. The process of operations 310, 312, and 313 can be referred to as monitoring the output of an audio input device for an activation trigger pattern. Once a match is detected, the flow simultaneously moves to operation 314 and the monitoring continues.

At operation 314, the source device activation trigger engine 116 provides causes the speech analysis engine 190 to be activated. The source device activation trigger engine 116 can activate the speech analysis engine 190 in a variety of ways, such as sending a signal to the speech analysis engine 190, executing a command, accessing an application programming interface associated with the speech analysis engine 190, populating a queue with data, or piping output of a recording device or process to the speech analysis engine 190, among other techniques.

In operation 324, the speech analysis engine 190 obtains the audio input data. In some examples, this includes some or all of the audio input data received in operation 310. For instance, the source device activation trigger engine 116 buffers the audio input data obtained and, when the audio input data is determined to match an activation trigger pattern, the contents of the buffer are provided to the speech analysis engine 190 for analysis. In such instances, the audio input obtained in operation 324 includes the activation trigger portion (e.g., activation trigger portion 210 as in utterance 202 of FIG. 2) in addition to other portions that the speech analysis engine processes (e.g., the command portion 220 and the parameter portion 230 as in utterance 202 of FIG. 2). Once the audio input data is provided to the speech analysis engine 190 or a threshold amount of time passes, the buffer is cleared. In other instances, the source device activation trigger engine 116 provides or redirects audio obtained after detection of the activation trigger to the speech analysis engine 190. In such instances, the speech analysis engine 190 obtains audio input data for a portion of an utterance following the activation trigger portion but not the activation trigger portion itself. In some instances, the audio input is "raw" audio data. In other instances, the audio input includes features extracted from the audio data.

After receiving at least a portion of the audio input, the speech analysis engine 190 performs operation 326, which involves processing the audio input data. Processing audio input takes a variety of different forms. In many examples, processing audio input involves performing speech-to-text transcription of the audio input. In other examples, processing audio input involves determining an intent associated with the utterance. For instance, if the speech analysis engine 190 were processing the utterance 202 as audio input, the speech analysis engine 190 performs speech-to-text transcription on the utterance 202 to determine that the audio input data corresponds to the text "ahoy computer, log me in with voice".

At operation 328, the speech analysis engine 190 provides output based on the processing in operation 326. As will be understood, the output is based on the type of processing performed. In some instances, the output or audio data is provided to another analysis or processing engine for further processing, such as text analysis, natural language processing, emotion detection, or other processing. In other instances, that additional processing is performed by the speech analysis engine 190 in operation 326, and the results of that additional processing can be provided.

In some examples, the speech analysis engine 190 determines that the user's intent is to perform a log-in-with-voice process. For example, the speech analysis engine 190 receives a log-in utterance indicating that a log-in-with-voice process should be executed. For instance, responsive to a log-in utterance corresponding to the text "ahoy computer, log me in with voice", the process 300 provides an output indicating that a login with voice command should be executed. In an example, the output involves providing the utterance 202 (or a representation thereof) to the match engine 191 for further processing. For instance, providing the source device ambient sound recording 118 for matching responsive to determining that the source device ambient sound recording 118 includes a log-in utterance. In another instance, providing the target device ambient sound recording 158 for matching responsive to determining that the target device ambient sound recording 158 includes a log-in utterance.

Figure 4:
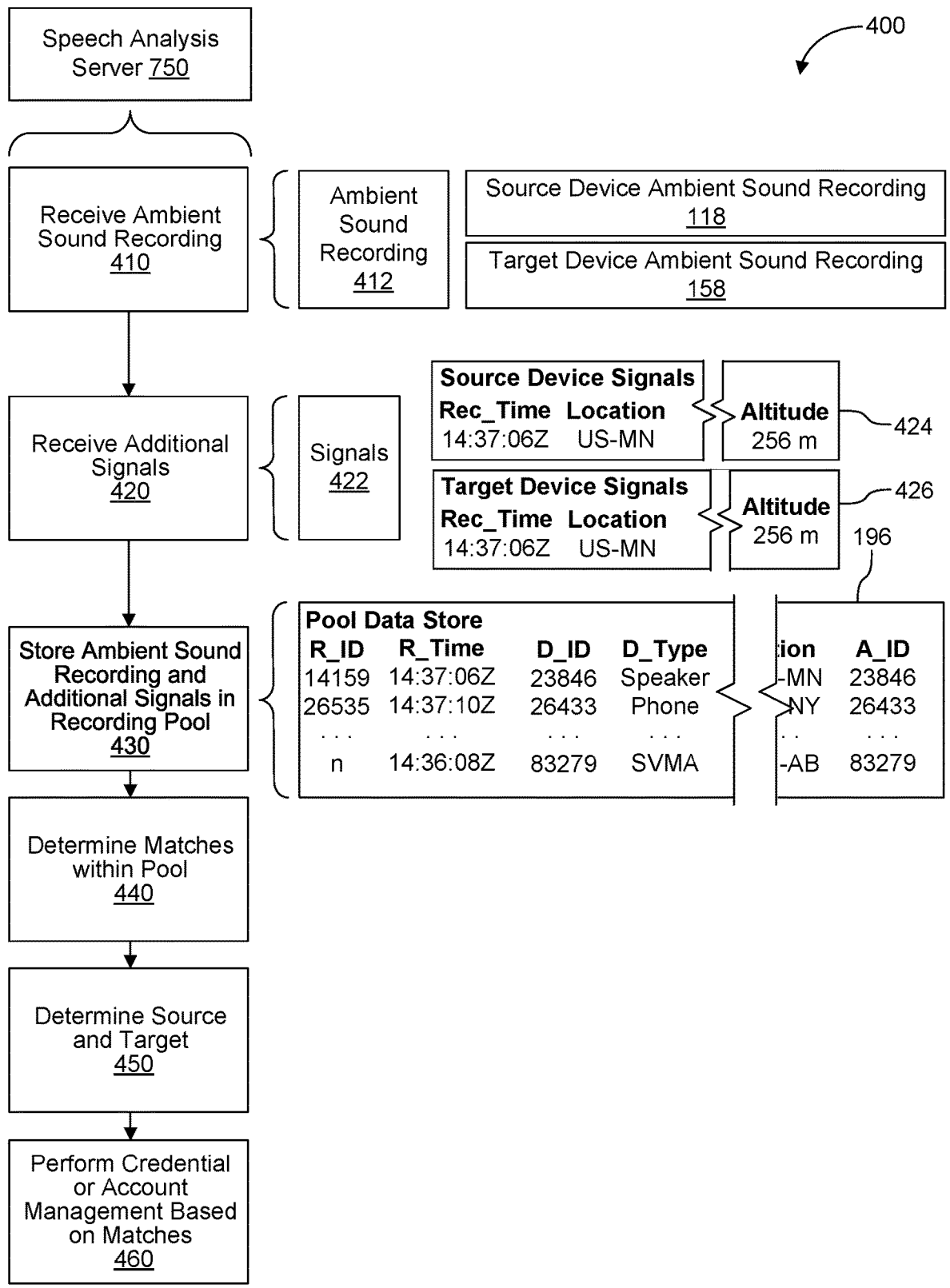
FIG. 4 illustrates a process for performing credential or account management based on two or more ambient sound recordings.

An example process for processing with the match engine 191 is shown and described in FIG. 4.

Process for Credential or Account Management Using the Match Engine

FIG. 4 illustrates a process 400 for performing credential or account management based on two or more recordings.

At operation 410, an ambient sound recording 412 is received. For instance, receiving, from the source device 110 associated with the source device account 114, the source device ambient sound recording 118. In another instance, receiving, from the target device 150, the target device ambient sound recording 158. The ambient sound recording 412 is received in any of a variety of ways. In some instances, an application programming interface of the match engine 191 is called that specifies the ambient sound recording 412 as a parameter. In some examples, the parameter is an audio file of the ambient sound recording. In other examples, the parameter is a data structure that represents the ambient sound recording (e.g., a data structure specifying extracted features of the ambient sound recording 412, such as an audio fingerprint). In other examples, the parameter is a pointer or other link to a location at which the audio file or representation is stored. In some examples, the match engine 191 includes a queue into which the ambient sound recording 412 is placed prior to processing.

At operation 420, additional signals 422 associated with the ambient sound recording 412 are received. The signals 422 include, for example, signals obtained from a device that produced the ambient sound recording 412. In an example, the signals 422 are source device signals 424 of the source device 110. For instance, the operation 420 includes obtaining source device signals 424 from the source device 110. In an example, the signals 422 are target device signals 426 of the target device 150. For instance, the operation 420 includes obtaining target device signals 426 from the target device 150. The signals 422 are additional data that can be used to determine whether a match exists for the ambient sound recording 412. Examples of signals 422 include timing information regarding the recording 412, such as a time at which a device began or ended recording the ambient sound recording 412, a time at which the ambient sound recording 412 was sent, or a time at which the ambient sound recording 412 was received, among other times.

Examples of signals 422 also include a location of a device that made the ambient sound recording 412. Location takes various forms and levels of granularity. In some instances, the location includes GPS coordinates, an address, a street name, a neighborhood name, a city name, a county name, a state name, a province name, a region name (e.g., U.S. East), a country name, a continent name, or others. In some instances, the location includes an indication of an accuracy or an estimate of the location (e.g., accurate within 500 feet). In some instances, the location can further describe an altitude of the device that made the ambient sound recording 412, or one or more WI-FI SSIDs near the device that made the ambient sound recording 412. Example signals 422 further include a device type of the device that made the ambient sound recording 412 and a device identifier of the device that made the ambient sound recording 412, among other data. In some instances, the information is a last-known value, such as a last-known location.

In some examples, the signals 422 are provided with or inferred from a message that provided the ambient sound recording 412 to the speech analysis server 750 (e.g., by analyzing metadata of the message or a traceroute of the message). In some examples, the signals 422 are provided as a parameter to the API call that specified the ambient sound recording 412. In examples, a component of the server 750 requests additional data from the device that provided the ambient sound recording 412. For instance, responsive to the match engine 191 receiving the ambient sound recording 412, the match engine 191 requests additional data (e.g., one or more of the signals 422 discussed above) from the device that recorded the ambient sound recording 412.

In some instances, the one or more signals 422 include additional signals contained within the ambient sound recording 412 (e.g., a watermark, identifications of other sounds within the recording, and sonic qualities of the ambient sound recording 412 such as echoes, among others), an indication whether the device that produced the ambient sound recording 412 is moving, or an indication of a network path the target device used to send the ambient sound recording 412, among others.

In an example, the signals 422 are stored in a data structure in a data store. The data structure can define a variety of fields for storing data, such as a Rec_Time field (e.g., a recording time field for storing a time associated with the ambient sound recording 412, such as a time that the ambient sound recording 412 was made), a location field (e.g., for storing a location where the ambient sound recording 412 was made), and an altitude field (e.g., for storing the altitude at which the ambient sound recording 412 was made), among other fields.

At operation 430, the ambient sound recording 412 and the signals 422 are stored in the pool data store 196. For instance, storing the source device ambient sound recording 118 in a pool data store 196. For instance, storing the target device ambient sound recording 158 in the pool data store 196. In some examples, the ambient sound recording 412 is stored as an audio file. In other examples, the ambient sound recording 412 is stored as audio features extracted from the audio of the ambient sound recording 412, such as an audio fingerprint. In an example, the match engine 191 (or another component) performs audio fingerprinting on the ambient sound recording 412 to obtain an audio fingerprint. The match engine 191 then stores the audio fingerprint in the pool data store 196 for later comparison.

Various techniques can be used for feature extraction and fingerprinting the ambient sound recording 412. In some examples, mel-frequency cepstrum representation of audio data is used to generate cepstral coefficients features for processing. In other examples, mel-frequency cepstral coefficients, log filter banks, cepstral analysis, or other techniques are used. In other examples, feature extraction is performed using invertible feature extraction (e.g., using Fourier transforms). For instance, instead of relying on features or parameters only from a time domain of a signal, the signal is transformed into a frequency domain using Fourier transformation. Parameters are then extracted from the frequency domain.

In an example, the pool data store 196 includes a table that describes information about the one or more ambient sound recordings in the pool by storing one or more records. In an example, each record in the table includes data associated with a respective ambient sound recording 412 and signals 422 associated therewith. For instance, the table can include a first record describing the source device ambient sound recording 118 (e.g., by storing an audio fingerprint thereof and the source device signals 424), and a second record describing the target device ambient sound recording 158 (e.g., by storing an audio fingerprint thereof and the target device signals 426). Each record of the table includes data associated with one or more fields of the table, such as an R_ID field (e.g., a recording identifier field for storing an identifier of the ambient sound recording 412 associated with the record), an R_Time field (e.g., a recording time field for storing data associated with a time at which the ambient sound recording 412 associated with the record was created), a D_ID field (e.g., a device identifier field for storing an identifier of the device that created the ambient sound recording 412 associated with the record), a D_Type field (e.g., a device type field for storing a type of device that created the ambient sound recording 412 associated with the record), a location field (e.g., for storing a location of the device that created the ambient sound recording 412 associated with the record), and an A_ID field (e.g., an account identifier field for storing an identifier of the account associated with the ambient sound recording 412 associated with the record), among other fields (e.g., an audio fingerprint field sorting an audio fingerprint of the ambient sound recording 412 associated with the record).

At operation 440, matches between ambient sound recordings in the pool data store 196 are determined. For example, matching the source device ambient sound recording 118 and the target device ambient sound recording 158 together. For example, matching based on one or more similarities between the source device ambient sound recording 110 and the target device ambient sound recording 158. In many examples, the matches are determined using the audio characteristics of the ambient sound recordings in the pool data store 196. The matches are also determined by the match engine 191 using the signals of the ambient sound recordings as criteria for determining a match. For example, as part of the match determination process, the match engine 191 further estimates or determines a start time of the ambient sound recording 412. In such instances, the match engine 191 compares the start time of the ambient sound recording 412 with other ambient sound recordings in the pool data store 196 to identify ambient sound recordings with sufficiently similar start times. If the start times are sufficiently close (e.g., within a small enough amount of time still able to account for variations in activation trigger processing time, system clock inaccuracy, and differences in when the time was recorded), then such a determination weighs in favor of the ambient sound recordings matching. In some examples, audio synchronization tools (e.g., PLU-RALEYES by RED GIANT LLC) can be used to match ambient sound recordings in the pool data store 196. For instance, two or more ambient sound recordings are provided as input to the audio synchronization tool. If the audio synchronization tool is able to synchronize a pair of the ambient sound recordings, then the ambient sound recordings of the synchronized pair are matched.

In still further examples, the match engine 191 uses location as a determining factor. For instance, the match engine 191 receives the location of the device that created the ambient sound recording 412. The location can have various levels of specificity including but not limited to region, continent, country, state, province, city, county, ZIP Code, GPS location, among other location information. The match engine 191 compares the locations of the ambient sound recordings in the pool data store 196 and uses a similarity in a location as an indication that the ambient sound recordings match. The match engine 191 compares the altitude or elevation information of the ambient sound recordings in the pool data store 196 and uses a similarity as an indication that the ambient sound recordings match.

The pool data store 196 can be queried based on the data contained therein, such as an audio fingerprint or various signals. In instances where the pool data store 196 includes a database of the relevant information, the database is queried using the audio fingerprint and one or more of the signals 422. In other instances, the match engine 191 iterates through one or more of the recordings and calculates a likelihood that the recording matches another recording in the pool data store 196.

The operation can include determining a likelihood that two ambient sound recordings match and if the likelihood satisfies a threshold, then the match between the ambient sound recordings is determined. This likelihood is determinable in a variety of different ways including using the ambient sound recording 412 and the signals 422. The various data stored in the pool data store 196 can have various weights usable in calculating a likelihood of a match. For instance, similarities in audio fingerprints between ambient sound recordings is heavily weighted in the calculation such that recordings that do not have similar audio fingerprints have a low likelihood of matching.

Aspects such as ambient sound recording start time may be weighted heavily as well, but there may be some variance allowed to account for various factors in discrepancies in time (e.g., due to variations in activation trigger processing time, due to system clocks being off, or due to differences in when the time was recorded). In further examples, the lack of data may be dispositive in some instances and may be highly relevant in others. For instance, a device that produced a recording may not include a GPS device or be otherwise unable to obtain an accurate location. The lack of location for a recording in a pool data store 196 need not disqualify the ambient sound recording as a potential candidate for a match. In many instances, both filtering and analysis are used. For example the ambient sound recording in the pool data store 196 are filtered according to relative similarity of audio fingerprints, and then the likelihood is determined further based on additional signals. In an example, a machine learning framework is used to determine the likelihood (e.g., a neural network trained to determine likelihood that recordings match, a decision tree, a heuristic-based framework, among others). The machine learning framework receives the signals 422 and audio fingerprint for two ambient sound recording as input. As output, the machine learning framework provides a confidence level (e.g., a likelihood) that the two ambient sound recording match.

If no matches are found between ambient sound recordings, then the ambient sound recordings are kept in the pool data store 196 for later matching. If a recording remains in the pool data store 196 for sufficiently long, then the match engine 191 executes a remedial process. For instance, if no matches are found for an ambient sound recording within a threshold amount of time, then the match engine 191 sends a message to the device that provided that ambient sound recording indicating an error and prompting the device to try again.

If too many matches are found, the match engine 191 sends a message to devices associated with the matching ambient sound recordings asking the devices for more information (e.g., location information or more precise location information). In an example, the match engine 191 causes a device to display a particular code (e.g., a string of letters or numbers) and requests that users of devices associated with the accounts enter in the code displayed on the target device (e.g., via an SMS message, an in-app message, or in other manners). If the match engine 191 receives a response with the particular code, then the match engine 191 matches the device that sent the message with the device that displayed the code.

The result of operation 440 is a match between two devices. In an example, the result is a data structure identifying both devices by the device identifiers of the devices.

At operation 450, the match engine 191 determines which of the matched devices is a source device and which of the matched devices is a target device for the purpose of transferring credentials or account access. For instance, after matching and prior to associating, determining to associate the target device 150 with the source device account 114 based on the source device signals 424 and the target device signals 426. Various techniques may be used to make this determination.

In some instances, the ambient sound recordings or messages from the device that made the ambient sound recording or sent the message further include an indication of source and target. For instance, the utterance may specify a target (e.g., "ahoy computer, log me in to [name of device] with voice"). The speech analysis engine 190 determines the source and target using the utterance and tags the recordings based thereon. The match engine 191 uses the tag to determine whether a device is a source device or a target device.

In many examples, though, there is no explicit identification. In such instances, a hierarchy of device types can be relied on. For example, the order may be: streaming devices, smart speakers, desktops, laptops, tablets, and smartphones. In the example, the device types earlier in the hierarchy have preference to device types later in the hierarchy. For instance, the determining to associate the target device 150 with the source device account 114 based on a hierarchy of device types, the device type of the source device 110, and the device type of the target device 150. In an example, in a match between a smartphone and a smart speaker, the smartphone is designated as the source device 110 and the smart speaker is designated as the target device 150, based on their location in the hierarchy of device types. This hierarchy is just an example and other device types are usable. Generally, device types associated with high-quality sound output will rate higher than device types associated with low quality sound output. So, for instance, a smartphone may rank relatively low, but a smartphone that is paired via BLUETOOTH to a BLUETOOTH-enabled speaker system may rank relatively higher than a smartphone that is not associated with a speaker system because of its perceived increase in sound quality.

In another example, the access management engine 192 determines a source and target based on relative volume in sound recordings. For instance, a device that provided a lower volume recording will be determined to be the target device and a device that provide a higher quality recording will be a source device. This is because, for example, the source device is likely to be closer to a user than a target device and therefor provide a higher-quality (or at least a higher in volume) recording.

In another example, the match engine 191 determines the source and the target using activity logs of the devices. For instance, the match engine obtains activity logs describing recent activity of the matched devices. The activity logs can indicate whether the device was recently in motion (e.g., recently used by a user while walking, running, or driving based on motion sensors of the device) or was relatively stable. The activity logs can also indicate whether the device was recently used to play media content items. In an example, the matched devices include a smartphone and a vehicle-based Personal Media Streaming Appliance (PMSA). The match engine 191 obtains the activity logs of the smartphone, which indicate that the smart phone was recently used to play media content items and was in motion toward the location of the PMSA. The match engine 191 obtains the activity logs of the PMSA, which indicate that the PMSA was recently activated (e.g., powered on) and is stationary. The match engine uses this data to determine that the smartphone is the source device and the PMSA is the target device responsive to determining that the smartphone was brought to the PMSA, which was recently activated.

In a further example, the determination of source and target by the match engine 191 is based on multiple factors, including: activity logs, relative volume, and device type. For instance, these factors are provided as input into a machine learning model configured to output an indication of source or target device. The match engine 191 uses the output of the machine learning model to determine the source and the target.

In yet another example, the match engine 191 determines the source and the target by prompting a user. For example, the match engine 191 selects one of the devices and causes that device to ask the user whether it is the device into which the user would like to log in. The speech analysis server 750 then receives a response from the user (an utterance responding to the question), analyzes the response via the speech analysis engine 190, and data associated with the response is provided to the match engine 191. If the response indicates that the device is the device that the user would like to log into, then that device is identified as the target device 150. If not, then that device is not a candidate for the target device 150.

As a result of operation 450, a device is identified as a source device and another device is identified as a target device.

At operation 460, the access management engine 192 performs credential or account management based on the identified source and target devices. For example, associating the target device 150 with the source device account 114 responsive to the matching. For instance, by the access management engine 192 providing credentials 111 associated with the source device 110 to the target device 150. The access management engine 192 obtains the credentials 111 of the source device account 114. For instance, the access management engine 192 selects the credentials 111 from a data store that stores account credentials. In other instances, the access management engine 192 generates new credentials 122 associated with the source device account 114 for providing to the target device 150. The access management engine 192 provides the credentials 111 to the target device 150 for use in, for example, causing media playback. In other examples, a device identifier of the target device 150 is added to an authorized list of devices for the source device account 114 instead of providing the credentials 111 to the target device 150.

Once the target device 150 receives the credentials or is otherwise associated with an account, the received credentials are stored locally at the target device 150 for use in accessing services (e.g., services provided by the media server application 684). In instances where the credentials are for use in a guest mode, the credentials are stored in a temporary area or are stored in association with a time limit. In some instances, the access management engine 192 does not provide the credentials themselves. Instead the access management engine 192 provides an identifier associated with credentials. For instance, this may be used where the target device 150 includes already multiple different sets of credentials and the target device 150 uses the provided identifier in order to select credentials stored locally in the target device to use.

The target device 150 can then use the received credentials to access services associated with the media server application 684. For instance, the target device 150 sends a playback request to a media server application that includes the credentials (or a token based thereon). In some instances, the access is performed automatically (e.g., to confirm that the credentials are usable) in other instances, the access is performed in response to a user request.

Process for Guest and Primary Modes

Figure 5:
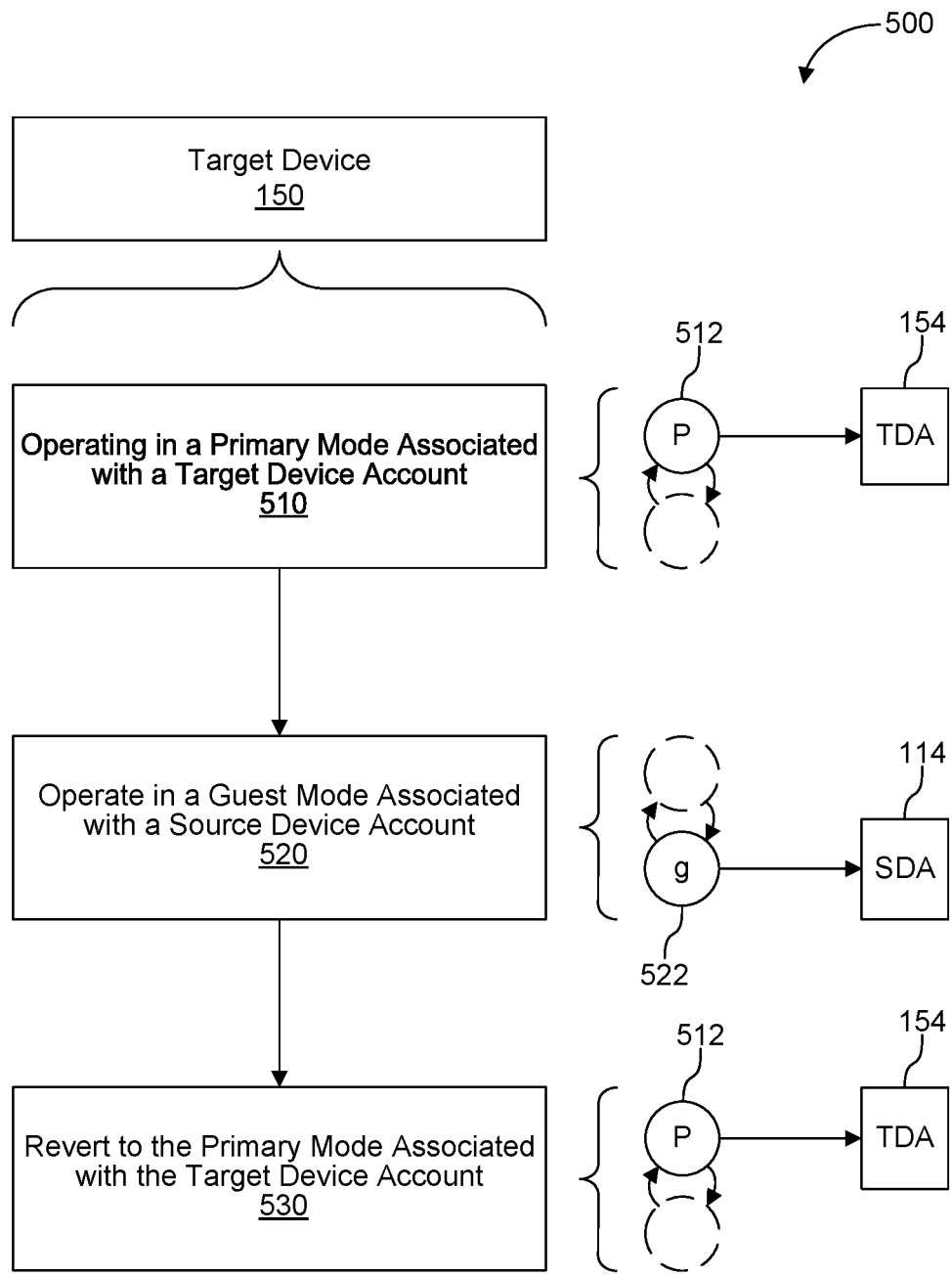
FIG. 5 illustrates a process for operating the target device in a primary mode and a guest mode.

FIG. 5 illustrates a process 500 for operating the target device 150 in a primary mode 512 and a guest mode 522. The process 500 begins with operation 510.

At operation 510, the target device 150 operates in a primary mode 512 associated with the target device account 154. In an example, the primary mode 512 is a mode in which the target device 150 remain indefinitely until a log out or switch account command is executed. In many examples, the primary mode 512 is a mode associated with an account of owner of the target device 150. Operating the target device 150 in the primary mode 512 associated with a target device account 154 includes the target device 150 using the target device account 154 to access services or content associated with the target device account 154. For example, the target device 150 is a smart speaker and target device account 154 is an account of the owner of the target device 150. The target device 150 then operates in a primary mode 512 associated with the target device account 154 (e.g., the owner's account) and obtains media content items using the target device account 154. This includes, for example, accessing a library of media content items associated with the target device account 154, and obtaining media content items according to a taste profile associated with the target device account 154, among other activities.

While operating in the primary mode 512, the target device 150 receives a guest mode command over a user interface. The guest mode command is a command that causes the target device 150 to begin the process of entering a guest mode (e.g., causes the process 500 to transition to operation 520). The target device 150 receives the guest mode command in any of a variety of ways. In an example, the target device 150 receives the guest mode command over a voice-based user interface. For instance, the target device 150 receives the utterance "enter guest mode", which the target device 150 analyzes (e.g., using natural language processing) and executes a guest mode process in response thereto. In another example, the target device 150 has a tactile or virtual button that, when activated, causes the target device 150 to execute a guest mode process in response thereto.

At operation 520, the target device 150 operates in the guest mode 522 associated with the source device account 114. For instance, associating the target device 150 with the source device account 114 includes operating the target device in a guest mode 522 associated with the source device account. In an example, this operation 520 includes, the target device 150 operating according to credentials associated with the source device account 114. The credentials can be obtained using any of a variety of techniques described herein, including but not limited to those described in relation to FIG. 1. Operating in the guest mode 522 takes various forms. In some instances, operating in the guest mode 522 includes the target device 150 operating with a limited set of permissions compared to the primary mode 512. For instance, while operating in the guest mode 522, the target device 150 may be unable to perform one or more of the following actions: downloading tracks to the target device 150, modifying an equalizer of the target device 150, changing wireless settings of the target device 150, changing security settings of the target device 150, changing an ownership of the target device 150, changing account management settings of the target device 150, playing explicit tracks on the target device 150, locking the target device 150, and obtaining primary mode status on the target device 150, among other actions. For example, the target device 150 operating in the guest mode 522, the target device 150 receives user input associated with changing the ownership of the target device 150 and provides an error message indicating that the action cannot be taken due to lack of permission.

In addition, the guest mode 522 may be a mode associated with a limited amount of time. For example, the target device 150 operates in the guest mode 522 for a limited amount of time (e.g., one hour, one day, one week, one month), until an a certain number of media content items are played (e.g., playback of one, two, three, or more media content items), until the occurrence of a particular event (e.g., receiving a revert command, detecting the presence of a device associated with the target device account) or another event, and then the target device 150 reverts to the primary mode 512 and the account associated therewith (e.g., the target device account 154). In another example, the device operates in the guest mode 522 until a reversion command is received, such as receiving user input associated with reverting to the primary mode 512 over a user interface (e.g., receiving an utterance over a voice based user interface of the target device 150 or receiving an indication that a virtual or physical user interface element associated with reversion has been actuated). An account operating in a primary mode 512 can customize the permissions of the guest mode 522.

In another example, the target device 150 operates in the guest mode 522 until an event occurs (e.g., until a device power event occurs). For instance the target device 150 automatically reverts to the primary mode 512 associated with the target device account 154 after an occurrence of an event. For instance, the target device 150 operates in the guest mode until the target device 150 powers on, powers off, enters a sleep mode, enters an inactive state, enters an active state, wakes up, restarts, loses power, or gains power, among others. The target device 150 then reverts to the primary mode 512 with the target device account 154.

In some examples, operating in a guest mode 522 includes the target device 150 storing credentials of the account associated with the primary mode 512. In an example, the target device 150 stores credentials associated with the primary mode in memory for later use. Storing the credentials in memory facilitates the target device 150 reverting from, for example, operating in the guest mode 522 associated with the source device account 114 to the primary mode 512 associated with the target device account 154 without re-receiving the credentials associated with the target device account 154, which saves the user time and reduces resource consumption (e.g., by not requiring the use associated with the target device account 154 to re-log into the target device 150).

At operation 530, the target device 150 reverts to the primary mode 512 associated with the target device account 154 from the guest mode 522 associated with the source device account 114. The reversion is triggered by one or more of the conditions or criteria described in operation 520. Reverting can include accessing credentials associated with the target device account 154 that are stored locally at the target device 150. In some examples, reverting includes obtaining the credentials from a server (e.g., the target device 150 accessing an application programming interface associated with the access management engine 192 at the media-delivery system 604).

Other Embodiments

In some examples, one or both of the target device 150 and the source device 110 identify that the user is requesting a log-in process before or after providing a recording to a server. For instance, the target device 150 may determine that a log-in process is being requested based on detecting over a user interface that a log-in user interface element is activated. In another example, the speech analysis server 750 sends a message to the target device 150, prompting the target device 150 to provide additional information to facilitate the matching process. In such instances, the source device 110 can provide additional information with the request usable for identifying the device during the process. For instance, the request can include additional metadata regarding the device including its location, altitude, and nearby WI-FI SSIDs, among other data. Where the identification is performed in response to activation of a particular user interface element, an indicator whether the device is a source or target can be provided. In other examples, the target device 150 or the source device 110 provides an audible signal to facilitate matching the recordings (e.g., an encoded message that facilitates matching).

In some examples, the target device 150 enters an association mode to prepare for becoming associated with a particular account or credentials. The target device 150 enters the association mode in response to a variety of causes. In some examples, the target device 150 automatically enters the association mode responsive to determining that the target device 150 is attempting to operate without credentials. For instance, the target device 150 may be powering up for a first time by an end user and the target device 150 was not preconfigured with an account. In other examples, the target device 150 finished a log-out mode in which the target device 150 disassociates itself from particular credentials. In other examples, the target device 150 receives a signal from another device (an electronic signal, an acoustic signal, among others) that causes the target device 150 to enter the association mode. In still other examples, the target device 150 enters the association mode responsive to the target device 150 receiving a user input. In an example, the target device 150 receives an utterance instructing the target device 150 to enter an association mode (e.g., the utterance "enter association mode") as input via an utterance-based user interface. In entering the association mode the target device 150 prepares to become associated with credentials or an account. In the illustrated example, responsive to entering the association mode, the target device 150 prepares to record ambient sound. The target device 150, activates one or more sound input devices, for instance. Where the target device 150 is already associated with credentials, entering the association mode further includes disassociating the target device 150 from existing credentials. In still further examples, entering the association mode takes different forms depending on a kind association mode selected. The target device 150 is able to operate in a variety of modes, each mode having its own characteristics and permissions. While in the association mode, the target device 150 generates additional signals (e.g., obtaining a more precise location) and provides the additional signals with messages to the server (e.g., messages with ambient sound recordings) to increase the likelihood that the device will be properly identified as a match.

While many examples herein are described in relation to media content items and streaming services, this disclosure need not be limited to those uses. In an example scenario, the source device 110 is a smartphone and the target device 150 is a voice-enabled corporate computer system into which a user wants to log in. One or more of the techniques described herein can be used to facilitate such a log-in process.

Device Environment

Figure 6A:
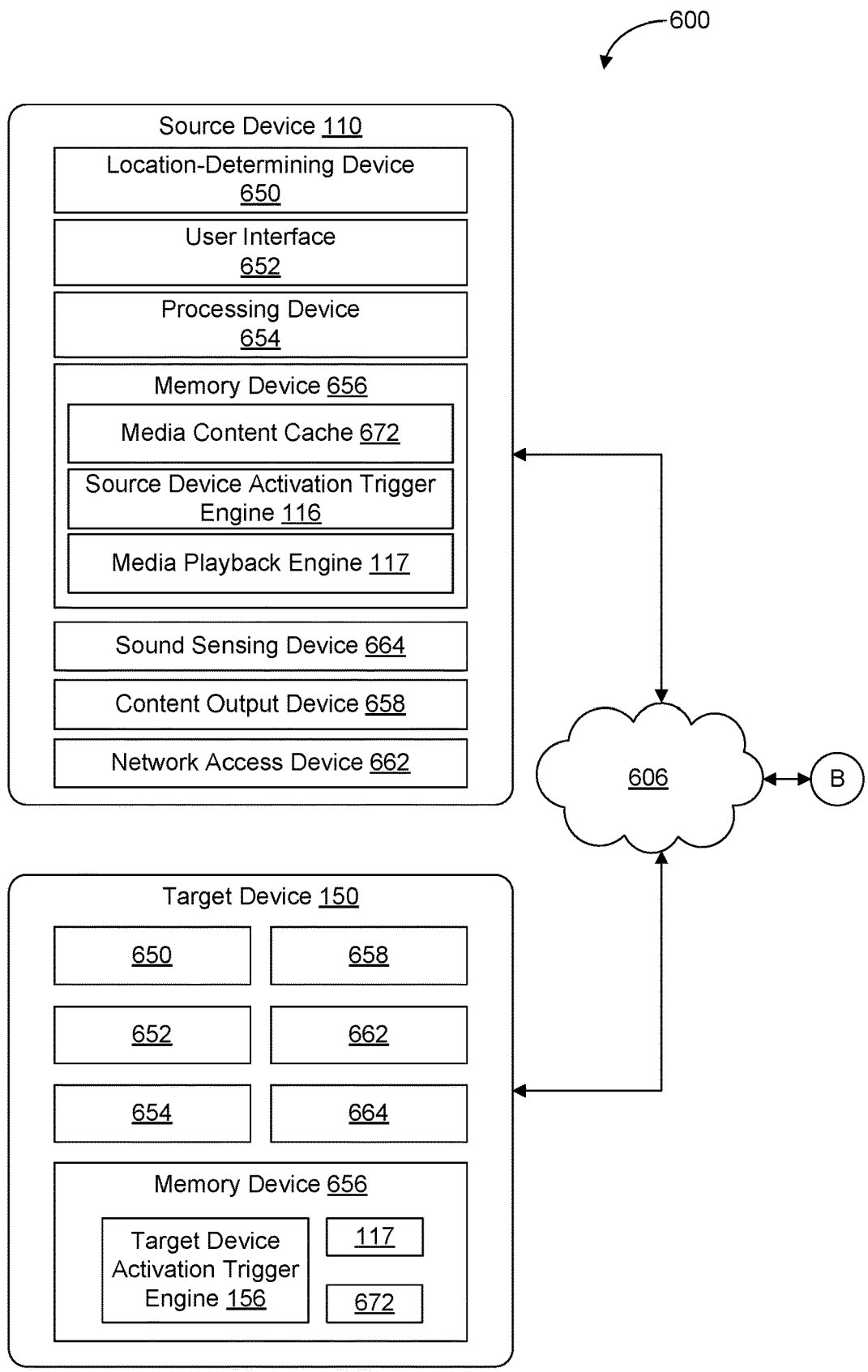
FIG. 6, which is made up of FIG. 6A and FIG. 6B, illustrates an example system for association via audio
Figure 6B:
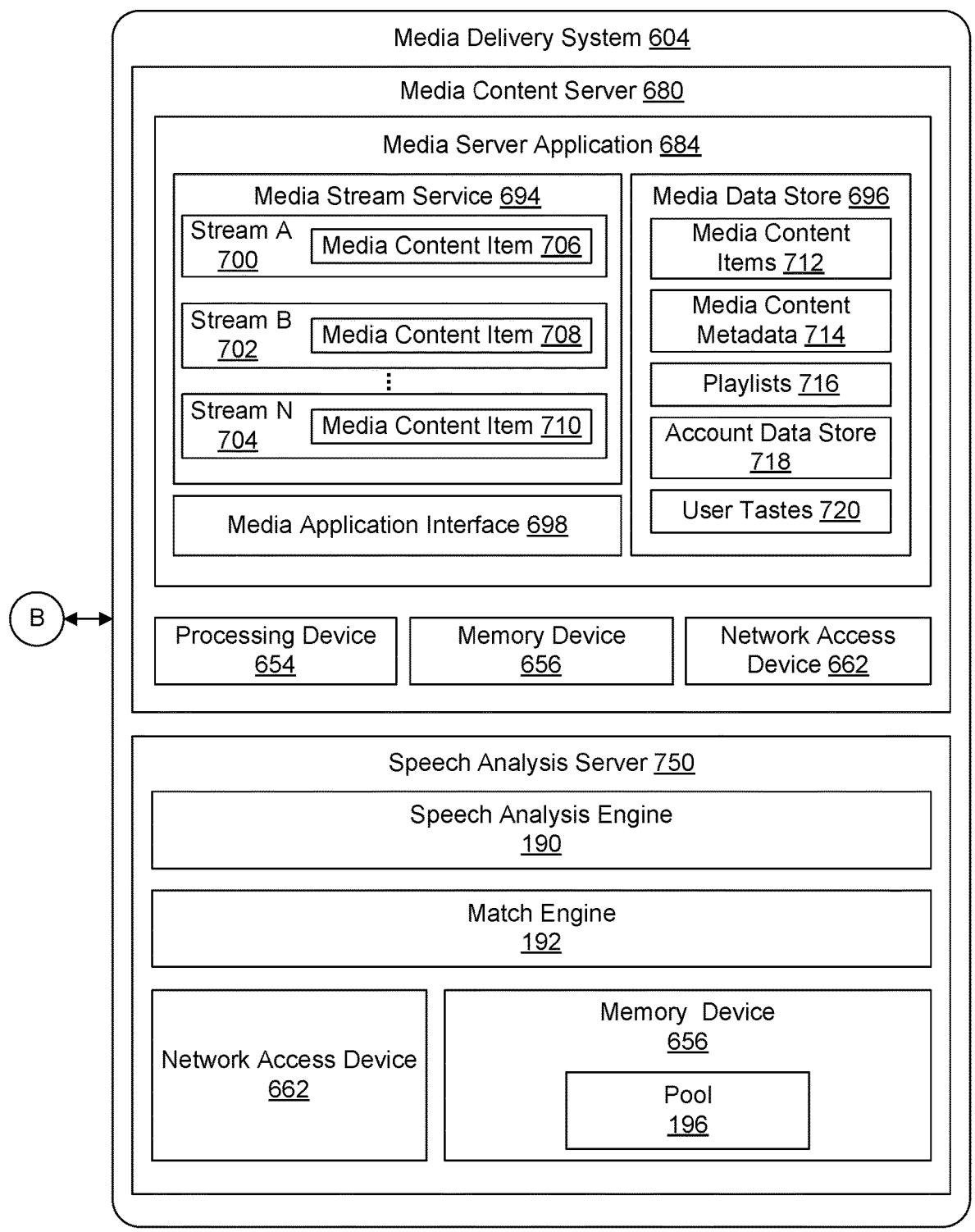

FIG. 6, which is made up of FIG. 6A and FIG. 6B, illustrates an example system 600 for association via audio. The example system 600 is a media content playback system for association via audio and includes the source device 110 including the source device activation trigger engine 116 and the target device 150 including the target device activation trigger engine 156. The source device 110 and the target device 150 each further including a media-playback engine 117. The source device 110 and the target device 150 are communicatively coupled across a network 606 to a media-delivery system 604.

Source Device

The source device 110 is a computing device. In some examples, the source device 110 is a computing device for playing media content items to produce media output. In some examples, the media content items are provided by the media-delivery system 604 and transmitted to the source device 110 using the network 606. A media content item is an item of media content, including audio, video, or other types of media content, which may be stored in any format suitable for storing media content. Non-limiting examples of media content items include songs, music, albums, audiobooks, music videos, movies, television episodes, podcasts, other types of audio or video content, and portions or combinations thereof.

The source device 110 plays the media content item for the user. The media content item is selectable for playback with user input. The media content is also selectable for playback without user input, such as by the source device 110 or the media-delivery system 604. In an example, media content is selected for playback by the media-delivery system 604 based on a user taste profile stored in association with an account.

The source device 110 selects and plays media content and generates interfaces for controlling playback of media content items. In some examples, the media-playback engine 117 receives user input over a user interface, such as a touch screen user interface, an utterance-based user interface, tactile user interfaces, virtual user interfaces, or other user interfaces and plays a media content item based thereon.

The source device 110 can include other input mechanisms including but not limited to a keypad and/or a cursor control device. The keypad receives alphanumeric characters and/or other key information. The cursor control device includes, for example, a handheld controller or mouse, a rotary input mechanism, a trackball, a stylus, and/or cursor direction keys.

As noted above, the source device 110 plays media content items. In some examples, the source device 110 plays media content items that are provided (e.g., streamed, transmitted, etc.) by a system external to the media-playback device such as the media-delivery system 604, another system, or a peer device. Alternatively, in some examples, the source device 110 plays media content items stored locally on the source device 110. Further, in at least some examples, the source device 110 plays media content items that are stored locally as well as media content items provided by other systems.

In some examples, the source device 110 is a computing device, handheld entertainment device, smartphone, tablet, watch, wearable device, or any other type of device capable of playing media content. In yet other examples, the source device 110 is a media playback appliance, such as an in-dash vehicle head unit, an aftermarket vehicle media playback appliance, a smart assistant device, a smart home device, a television, a gaming console, a set-top box, a network appliance, a BLU-RAY disc player, a DVD player, a media player, a stereo system, smart speaker, an Internet-of-things device, or a radio, among other devices or systems.

In at least some examples, the source device 110 includes a location-determining device 650, a user interface 652, one or more processing devices 654, a memory device 656, a content output device 658, a movement-detecting device, a network access device 662, and a sound-sensing device 664. Other examples may include additional, different, or fewer components.

The location-determining device 650 is a device that determines the location of the source device 110. In some examples, the location-determining device 650 uses one or more of the following technologies: Global Positioning System (GPS) technology that receives GPS signals from satellites, cellular triangulation technology, network-based location identification technology, WI-FI positioning systems technology, ultrasonic positioning systems technology, and combinations thereof. Examples of the location-determining device 650 further include altitude- or elevation-determining devices, such as barometers.

The user interface 652 operates to interact with the user, including providing output and receiving input. The user interface 652 can be a physical device that interfaces with the user (e.g., touch screen display) or a combination of devices that interact with the user (e.g., speaker and microphone for providing an utterance-based user interface).

In some examples, the user interface includes a touch-screen based user interface. A touch screen operates to receive an input from a selector (e.g., a finger, stylus, etc.) controlled by the user. In some examples, the touch screen operates as both a display device and a user input device. In some examples, the user interface 652 detects inputs based on one or both of touches and near-touches. In some examples, the touch screen displays a user interface for interacting with the source device 110. Some examples of the source device 110 do not include a touch screen.

Examples of the user interface 652 include input control devices that control the operation and various functions of the source device 110. Input control devices include any components, circuitry, or logic operative to drive the functionality of the source device 110. For example, input control device(s) include one or more processors acting under the control of an application.

While some examples of the source device 110 do not include a display device, where a source device 110 does include a display device, the source device 110 will often include a graphics subsystem and coupled to an output display. The output display uses various technologies, such as TFT (Thin Film Transistor), TFD (Thin Film Diode), OLED (Organic Light-Emitting Diode), AMOLED (active-matrix organic light-emitting diode) display, and/or liquid crystal display (LCD)-type displays. The displays can also be touchscreen displays, such as capacitive and resistive-type touchscreen displays.

The one or more processing devices 654 include one or more processing units, such as central processing units (CPU), digital signal processors, and field-programmable gate arrays, among others.

The memory device 656 operates to store data and instructions. In some examples, the memory device 656 stores instructions for the media-playback engine 117. Some examples of the memory device 656 also include a media content cache 672. The media content cache 672 stores media-content items, such as media content items that have been previously received from the media-delivery system 604. The media content items stored in the media content cache 672 are storable in an encrypted or unencrypted format, and decryption keys for some or all of the media content items are also stored. The media content cache 672 can also store metadata about media-content items such as title, artist name, album name, length, genre, mood, or era. The media content cache 672 can also store playback information about the media content items, such as the number of times the user has requested to playback the media content item or the current location of playback.

The memory device 656 typically includes at least some form of computer-readable media. Computer readable media includes any available media that can be accessed by the source device 110. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, BLU-RAY discs, DVD discs, other optical storage, magnetic cassettes, magnetic tape, magnetic disk storage or other magnetic storage devices, or any other medium that can be used to store the desired information and that can be accessed by the source device 110. In some examples, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 658 operates to output media content. In many examples, the content output device 658 provides media output for a user. In some examples, the content output device 658 provides media output to a target device 150. Examples of the content output device 658 include a speaker assembly having one or more speakers, an audio output jack, a BLUETOOTH transmitter, a display panel, and a video output jack. Other examples are possible as well, such as transmitting a signal through the audio output jack or BLUETOOTH transmitter to reproduce an audio signal by a connected or paired device such as headphones, speaker system, or vehicle head unit.

The network access device 662 operates to communicate with other computing devices over one or more networks, such as the network 606. Examples of the network access device include one or more wired network interfaces and wireless network interfaces. Examples of wireless network interfaces include infrared, BLUETOOTH wireless technology, 802.11a/b/g/n/ac, and cellular or other radio frequency interfaces.

In some examples, the source device 110 includes a movement-detecting device that senses movement of the source device 110, acceleration of the source device 110, determines an orientation of the source device 110, or includes other detecting devices. In at least some examples, the detecting devices includes one or more accelerometers or other motion-detecting technologies or orientation-detecting technologies.

The network 606 is an electronic communication network that facilitates communication between the source device 110, the media-delivery system 604, and in some instances, the target device 150. An electronic communication network includes a set of computing devices and links between the computing devices. The computing devices in the network use the links to enable communication among the computing devices in the network. The network 606 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various examples, the network 606 includes various types of links. For example, the network 606 includes wired and/or wireless links, including BLUETOOTH, ultra-wideband (UWB), 802.11, ZIGBEE, cellular, and other types of wireless links. Furthermore, in various examples, the network 606 is implemented at various scales. For example, the network 606 is implemented as one or more vehicle area networks, local area networks (LANs), metropolitan area networks, subnets, wide area networks (such as the Internet), or can be implemented at another scale. Further, in some examples, the network 606 includes multiple networks, which may be of the same type or of multiple different types.

Target Device

The target device 150 can include one or more of the components of the source device 110. The aspects described herein are relevant to using the source device account 114 of the source device 110 on the target device 150. In an example, the association is performed using a sound-sensing device 664 of the target device 150. In some examples, it is otherwise difficult for a user to provide account information to the target device 150, such as by the target device 150 lacking a keyboard, touch screen, or other components that facilitate arbitrary input. In some examples, the target device 150 lacks a direct connection to the target device 150 over BLUETOOTH, WI-FI, or other electronic communication schemes.

The sound-sensing device 664 senses sounds proximate the target device 150 (e.g., sounds within a vehicle in which the target device 150 is located). In some examples, the sound-sensing device 664 comprises one or more microphones. In some examples, the sound-sensing device 664 includes multiple microphones in a sound-canceling arrangement to facilitate operation in a noisy environment (e.g., configured for use in a vehicle). The sound-sensing device 664 is able to capture sounds from proximate the target device 150 and create a representation thereof. These representations are analyzed by the target device 150 or the media-delivery system 604.

In some examples, the representations are used to provide an utterance-based user interface. In such examples, speech-recognition technology is used to identify words spoken by the user. The words are recognized as commands affect the behavior of the target device 150 (e.g., affecting playback of media content by the target device 150). Natural language processing and/or intent-recognition technology are usable to determine appropriate actions to take based on the spoken words.

Additionally or alternatively, the sound-sensing device 664 determines various sound properties about the sounds proximate the user such as volume, dominant frequency or frequencies, among other properties. These sound properties are usable to make inferences about the environment proximate to the target device 150, such as whether the sensed sounds correspond to playback of a media content item. In some examples, the sound sensed by the sound-sensing device 664 are transmitted to media-delivery system 604 (or another external system) for analysis, such as using speech-recognition, intent-recognition, and media identification technologies, among others.

Media-Delivery System

The media-delivery system 604 includes one or more computing devices and provides media content items to the source device 110, target device 150, and, in some examples, other media-playback devices as well. The media-delivery system 604 includes a media content server 680. Although FIG. 6 shows single instances of the media content server 680 and the speech analysis server 750 some examples include multiple servers. In these examples, each of the multiple servers may be identical or similar and may provide similar functionality (e.g., to provide greater capacity and redundancy, or to provide services from multiple geographic locations). Alternatively, in these examples, some of the multiple servers may perform specialized functions to provide specialized services (e.g., services to enhance media content playback during travel or other activities, etc.). Various combinations thereof are possible as well.

The media content server 680 transmits stream media to media-playback devices, such as the source device 110 or target device 150. In some examples, the media content server 680 includes a media server application 684, one or more processing devices 654, a memory device 656, and a network access device 662.

In some examples, the media server application 684 streams music or other audio, video, or other forms of media content. The media server application 684 includes a media stream service 694, a media data store 696, and a media application interface 698. The media stream service 694 operates to buffer media content such as media content items 706, 708, and 710, for streaming to one or more streams 700, 702, and 704.

The media application interface 698 can receive requests or other communication from media-playback devices or other systems, to retrieve media content items from the media content server 680. For example, the media application interface 698 receives a communication from the media-playback engine 117.

In some examples, the media data store 696 stores media content items 712, media content metadata 714, and playlists 716. The media data store 696 may store one or more databases and file systems, such as the set of data structures 800 described in relation to FIG. 7. As noted above, the media content items 712 may be audio, video, or any other type of media content, which may be stored in any format for storing media content.

The account data store 718 are used to identify users of a media streaming service provided by the media-delivery system 604. In some examples, the media-delivery system 604 authenticates a user via data contained in the account data store 718 and provides access to resources (e.g., media content items 712, playlists 716, etc.) to a device operated by a user. In some examples, different devices log into a single account and access data associated with the account in the media-delivery system 604. User authentication information, such as a username, an email account information, a password, and other credentials, can be used for the user to log into his or her user account. A device can use stored credentials to log a user into the account on a device.

The media data store 696 includes user tastes data 720. The user tastes data 720 includes but is not limited to user preferences regarding media content items, such as media content items that the user likes/dislikes, media content item qualities that the user likes/dislikes, historical information about the user's consumption of media content, libraries of media content items, and playlists of media content items, among other user data.

The media content metadata 714 operates to provide various information associated with the media content items 712. In some examples, the media content metadata 714 includes one or more of title, artist name, album name, length, genre, mood, era, acoustic fingerprints, and other information. The playlists 716 operate to identify one or more of the media content items 712. In some examples, the playlists 716 identify a group of the media content items 712 in a particular order. In other examples, the playlists 716 merely identify a group of the media content items 712 without specifying a particular order. Some, but not necessarily all, of the media content items 712 included in a particular one of the playlists 716 are associated with a common characteristic such as a common genre, mood, or era. The playlists 716 may include user-created playlists, which may be available to a particular user, a group of users, or to the public.

In some examples, the media server application 684 or a dedicated access management server provides access management services. In examples, the media server application 684 exposes application programming interface endpoints usable by calling devices or functions to use access management services, such as services for logging in to an account, obtaining credentials associated with an account, generating credentials associated with an account, and other services.

Although in FIGS. 6A and 6B only a single source device 110, target device 150, and media-delivery system 604 are shown, in accordance with some examples, the media-delivery system 604 supports the simultaneous use of devices, and the source device 110 and the target device 150 simultaneously access media content from multiple media-delivery systems 604. Additionally, although FIGS. 6A and 6B illustrates a streaming media-based system for media-playback, other examples are possible as well. For example, in some examples, the source device 110 includes a media data store and the source device 110 selects and plays back media content items without accessing the media-delivery system 604. Further in some examples, the source device 110 operates to store previously-streamed media content items in a local media data store (e.g., in the media content cache 672).

In at least some examples, the media-delivery system 604 streams, progressively downloads, or otherwise communicates music, other audio, video, or other forms of media content items to the source device 110 or target device 150 for later playback. In accordance with an example, the user interface 652 receives a user request to, for example, select media content for playback on the source device 110.

Software examples of the examples presented herein may be provided as a computer program product, or software, that may include an article of manufacture on a machine-accessible or machine-readable medium having instructions.

The instructions on the non-transitory machine-accessible machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. In some examples, there are one or more processors that operate as a particular program product or engine. In some examples, one or more processors are coupled to a memory storing instructions which when executed cause the one or more processors to operate in a particular manner. In some examples, the one or more processors include two or more sets of processors operating on different devices.

The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some examples include a computer program product. The computer program product may be a storage medium or media having instructions stored thereon or therein which can be used to control, or cause, a computer to perform any of the procedures of the examples of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the examples of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

Various operations and processes described herein can be performed by the cooperation of two or more devices, systems, processes, or combinations thereof.

Set of Data Structures

Figure 7:
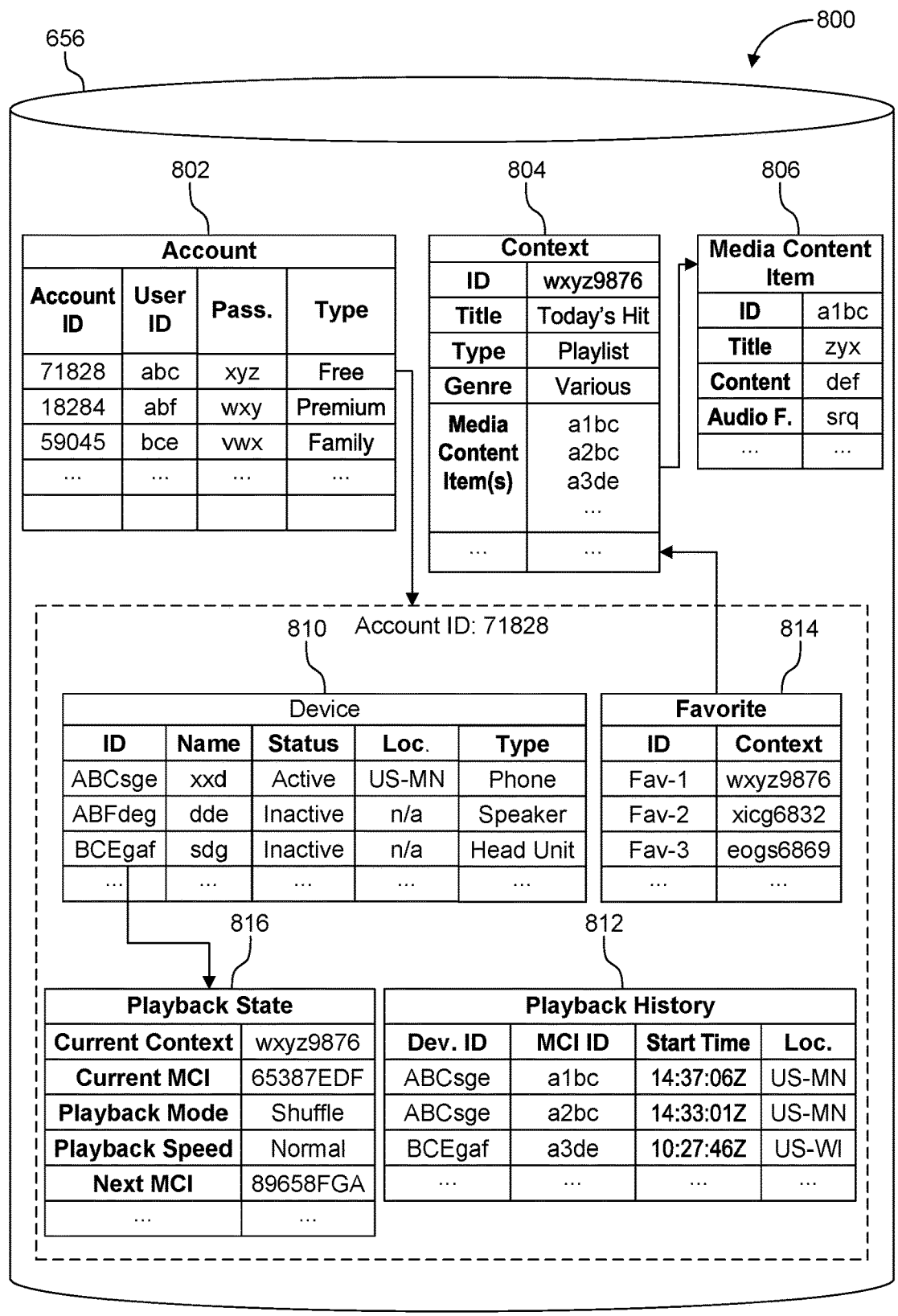
FIG. 7 illustrates an example set of data structures stored in a data store.

FIG. 7 illustrates an example set of data structures 800 storable in the media data store 696. As illustrated, the set of data structures 800 includes an account table 802, a media content item context data structure 804, and a media content item data structure 806. For each account record in the account table 802, the set of data structures 800 includes a device data table 810, a playback history table 812, a favorite table 814, and a playback state data structure 816. It is noted that, where user data is used, it can be handled according to a defined user privacy policy and can be used to the extent allowed by the user. Where the data of other users is used, it can be handled in an anonymized matter so the user does not learn of the details of other users generally or specifically. In addition, the data contained in the set of data structures 800 is stored according to a defined security policy and in accordance with applicable regulations.

As illustrated, each account record in the account table 802 has a relationship with a device data table 810, a playback history table 812, and a favorite table 814. Each device record in the device data table 810 has a relationship with a playback state data structure 816. Each device record in a favorite table 814 has a relationship with a media content item context data structure 804. Each context data structure has a relationship with the media content item data structure 806.

The account table 802 stores one or more account records usable to identify accounts of the media-delivery system 604. In some examples, some or all of the data from the pool data store 196 is obtained from the set of data structures 800. For instance, at least some of the data in pool data store 196 is obtained by querying the set of data structures 800 for particular data. For instance, the match engine 191 obtains a device identifier from a message that contained the ambient sound recording, and the match engine 191 determines the device type of the device by querying the device data table to determine a type of the device. In an example, where a particular account is referred to in this disclosure (e.g., the target device account 154), the account is associated with an entry stored in the set of data structures 800. In an example, when the target device 150 accesses the media-delivery system 604 under the target device account 154, the media-delivery system 604 locates an account record corresponding to the target device account 154 in the account table 802. The media-delivery system 604 then uses the data associated with the account record in the account table 802 to provide services associated with that account. For instance, the media-delivery system 604 provides a media content item described in the favorite table 814 to the target device 150 and updates the playback history table 812 accordingly.

The account table 802 references one or more other tables, and is referenced by one or more other tables. In an example, each account record of the account table 802 corresponds to an account. For instance, the target device account 154 corresponds to a target device account record in the account table 802, and the source device account 114 corresponds to a source device account record in the account table 802. Each account record of the account table 802 includes data associated with one or more fields of the account table 802, such as an account ID field, a user ID field, a password field, and a type field. The account ID field stores an identifier of the account record, such as using a number. The user ID field stores an identifier of a user, such as the user's name. The password field stores data associated with a password of the user, such as a hashed and salted password. The type field identifies subscription types associated with the account record.

Each account record identified in the account table 802 is associated with, and identifies, data for providing various services from the media-delivery system 604. In some examples, the data includes the device data table 810, the playback history table 812, the favorite table 814, and the playback state data structure 816, among others. In the illustrated example, the tables 810, 812, and 814 are primarily described in association with a single record (e.g., the record having the Account ID: 81828). However, it is understood that, in other examples, the tables 810, 812, and 814 are structured to be associated with a plurality of accounts The device data table 810 identifies one or more devices associated with a particular account record of the account table 802. The device data table 810 is referenced by the account table 802 or other tables. The device data table 810 can reference one or more other tables.

In an example, each device record of the device data table 810 includes data associated with a device. For instance, a first device record of the device data table 810 corresponds to the source device 110, and a second device record of the device data table 810 corresponds to the target device 150 once both devices 110, 150 have been associated with the same account. Each device record of the device data table 810 includes data associated with one or more fields of the device data table 810, such as a device ID field (e.g., storing device identifier data, such as an alphanumeric identifier), a name field (e.g., for storing a device name), a status field (e.g., for storing a status of the device, such as whether the device is currently active or inactive), a location field (e.g., for storing a last-known location of the device), and type field (e.g., for storing a type of the device, such as a phone device, a speaker device, or a vehicle head unit).

The playback history table 812 describes the media content items played by the account by storing one or more playback records. The playback history table 812 can reference and be referenced by one or more other tables. In an example, each playback record of the playback history table 812 includes data associated with a media content item played by a respective account or device. Each playback record of the playback history table 812 includes data associated with one or more fields of the playback history table 812, such as a device ID field (e.g., for storing an identifier of the device that caused playback of the playback record), a MCI (Media Content Item) ID field (e.g., for storing an identifier of the media content item that was played back), a start time field (e.g., for identifying the start time at which the media content item was played back), and a location field (e.g., for identifying the location of the device associated with the device ID when playback was initiated).

The favorite table 814 describes information about favorite media content item contexts associated with the account by storing one or more favorite records. The favorite table 814 includes information about favorites associated with an account. The favorite table 814 can reference and be referenced by one or more other tables. In an example, each favorite record of the favorite table 814 includes data associated with a favorite media content item context (e.g., album or playlist). Each favorite record of the favorite table 814 includes data associated with one or more fields of the favorite table 814, such as an ID field (e.g., for identifying the favorite record) and a context field (e.g., for identifying a media content item context associated with the favorite record).

The context data structure 804 is a data structure (e.g., record of a table or other data structure) that contains data associated with a media content item context (e.g., album or playlist). The context data structure 804 can reference and be referenced by one or more tables or other data structures. The context data structure 804 stores data regarding a particular media content item context in one or more fields, such as an ID field (e.g., for identifying the context data structure 804), a title field (e.g., a string naming the context data structure 804), a type field (e.g., for describing the type of the media content item context, such as a playlist, album, or television season), and media content item field (e.g., for identifying one or more media content items of the context data structure 804)

The media content item data structure 806 is a data structure (e.g., record of a table or other data structure) that contains data associated with a media content item. The media content item data structure 806 can reference and be referenced by one or more tables or other data structures. The media content item data structure 806 stores data regarding a particular media content item in one or more fields, such as an ID field (e.g., storing an identifier of the media content item data structure 806), a title field (e.g., storing a title of the media content item data structure 806, such as a song title), a content field (e.g., storing the content of the media content item or a link to the content of the media content item data structure 806, such as the audio content of a song), and an audio fingerprint field. In an example, the audio fingerprint field stores an audio fingerprint of the content of the media content item data structure 806.

The playback state data structure 816 is a data structure (e.g., a record of a table or other data structure) that contains data associated with a state of a device (e.g., a state associated with a device record of the device data table 810). The playback state data structure 816 can reference and be referenced by one or more tables or other data structures. The playback state data structure 816 stores data regarding a particular playback state in one or more fields, such as a current context field (e.g., describing a current context from which a device is playing, such as by containing an identifier of the context), a current MCI (Media Content Item) (e.g., describing a current media content item that is playing, such as by containing an identifier of the media content item), a playback mode field (e.g., describing a playback mode of the device, such as shuffle or repeat), a playback speed field (e.g., describing a current playback speed), and a next MCI field (e.g., describing the next media content item to be played).

Various operations and processes described herein can be performed by the cooperation of two or more devices, systems, processes, or combinations thereof.

While various examples of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A method, comprising:
   receiving, from a first device, a first device ambient sound recording;
   receiving, from a second device, a second device ambient sound recording;
   matching the first device ambient sound recording and the second device ambient sound recording based on one or more similarities between the first device ambient sound recording and the second device ambient sound recording;
   determining, based on one or more first device signals and one or more second device signals:

(1) which of the first device and the second device is a source device having a source device account to be associated with a target device; and
(2) which of the first device and the second device is the target device to which the source device account is to be associated; and
associating the target device with the source device account; and
accessing, by the target device, a service associated with the source device account.

2. The method of claim 1, wherein associating the target device with the source device account includes providing credentials to the source device.

3. The method of claim 1, further comprising:
providing the first device ambient sound recording for matching responsive to determining that the first device ambient sound recording includes a log-in utterance; and
providing the second device ambient sound recording for matching responsive to determining that the second device ambient sound recording includes a log-in utterance.

4. The method of claim 1, wherein matching the first device ambient sound recording and the second device ambient sound recording is further based on the first device signals.

5. The method of claim 4, wherein matching the first device ambient sound recording and the second device ambient sound recording is further based on the second device signals.

6. The method of claim 5,
wherein the one or more first device signals include a first device type;
wherein the one or more second device signals include a second device type; and
wherein the determining is further based on the relative locations of the first device type and the second device type within a hierarchy of device types.

7. The method of claim 1, further comprising:
prior to associating the target device with the source device account, operating the target device in a primary mode associated with a target device account.

8. The method of claim 7, wherein associating the target device with the source device account includes operating the target device in a guest mode associated with the source device account.

9. The method of claim 8, wherein the target device automatically reverts to the primary mode associated with the target device account after an occurrence of an event.

10. The method of claim 9, wherein the event is a device power event.

11. The method of claim 1, further comprising:
storing the first device ambient sound recording in a pool data store;
storing the second device ambient sound recording in the pool data store; and
determining matches between recordings in the pool data store.

12. The method of claim 11, wherein determining the matches between recordings in the pool data store includes the matching of the first device ambient sound recording and the second device ambient sound recording.

13. The method of claim 12, further comprising removing the first device ambient sound recording and the second device ambient sound recording from the pool data store after the matching of the first device ambient sound recording and the second device ambient sound recording.

14. The method of claim 1,
wherein the one or more first device signals or the one or more second device signals include:
an utterance in the first device ambient sound recording or the second device ambient sound recording that identifies a specific device as being the second device or the first device;
a volume of the first device ambient sound recording;
a volume of the second device ambient sound recording;
an activity log of the first device; or
an activity log of the second device.

15. A system comprising:
one or more processing devices; and
a memory device coupled to the one or more processing devices and comprising instructions thereon that, when executed by the one or more processing devices, cause the one or more processing devices to:
receive, from a first device associated with a first device account a first device ambient sound recording;
receive, from a second device, a second device ambient sound recording;
match the first device ambient sound recording and the second device ambient sound recording based on one or more similarities between the first device ambient sound recording and the second device ambient sound recording;
after the match, determine, based on one or more first device signals and one or more second device signals:
(1) which of the first device and the second device is a source device having a source device account to be associated with a target device; and
(2) which of the first device and the second device is the target device to which the source device account is to be associated; and
associate the target device with the source device account responsive to the determination; and
access, by the target device, a service associated with the source device account.

16. A method, comprising:
receiving, from a first device, a first device ambient sound recording;
receiving, from a second device, a second device ambient sound recording;
matching the first device ambient sound recording and the second device ambient sound recording based on one or more similarities between the first device ambient sound recording and the second device ambient sound recording;
identifying the first device as a source device having a source device account to be associated with a target device;
identifying the second device as the target device with which the source device account of the first device is to be associated; and
associating the target device with the source device account responsive to the determining; and
accessing, by the target device, a service associated with the source device account.

17. The method of claim 16, wherein the identifying of the first device as the source device and the identifying of the second device as the target device is based on an utterance in the first device ambient sound recording or the second device ambient sound recording that identifies the first device as the source device or that identifies the second device as the target device.

18. The method of claim 16, wherein the identifying of the first device as the source device and the identifying of the second device as the target device is based on a volume of the first device ambient sound recording and a volume of the second device ambient sound recording.

19. The method of claim 16, wherein the identifying of the first device as the source device and the identifying of the second device as the target device is based on an activity log of the first device or an activity log of the second device.

* * * * *